(12) United States Patent
Kuroki et al.

(10) Patent No.: US 8,364,386 B2
(45) Date of Patent: Jan. 29, 2013

(54) STOP-START CONTROL APPARATUS AND METHOD FOR AN INTERNAL COMBUSTION ENGINE

(75) Inventors: Rentaro Kuroki, Susono (JP); Hiroki Ichinose, Fujinomiya (JP); Takayuki Otsuka, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 607 days.

(21) Appl. No.: 12/667,945

(22) PCT Filed: Jul. 4, 2008

(86) PCT No.: PCT/IB2008/001766
§ 371 (c)(1),
(2), (4) Date: Jan. 6, 2010

(87) PCT Pub. No.: WO2009/007820
PCT Pub. Date: Jan. 15, 2009

(65) Prior Publication Data
US 2010/0204902 A1    Aug. 12, 2010

(30) Foreign Application Priority Data
Jul. 6, 2007  (JP) .................................. 2007-178271

(51) Int. Cl.
G06F 19/00    (2011.01)
F02N 19/00    (2010.01)
F02D 41/06    (2006.01)

(52) U.S. Cl. .................... 701/112; 701/113; 123/179.4; 123/179.16

(58) Field of Classification Search ............ 123/198 DB, 123/179.3, 179.4, 179.16, 299, 300, 491; 701/103–105, 112, 113
See application file for complete search history.

(56) References Cited

U.S. PATENT DOCUMENTS

| | | | | |
|---|---|---|---|---|
| 6,340,016 | B1 * | 1/2002 | Ueda et al. | 123/491 |
| 7,011,063 | B2 * | 3/2006 | Condemine et al. | 123/179.4 |
| 7,079,941 | B2 * | 7/2006 | Tetsuno et al. | 701/112 |
| 7,258,099 | B2 * | 8/2007 | Yoshida et al. | 123/299 |
| 7,461,621 | B2 * | 12/2008 | Ota et al. | 123/179.4 |
| 8,036,817 | B2 * | 10/2011 | Ota et al. | 701/113 |
| 2007/0204827 | A1 * | 9/2007 | Kishibata et al. | 123/179.16 |

FOREIGN PATENT DOCUMENTS

| | | |
|---|---|---|
| EP | 1 036 928 A2 | 9/2000 |
| EP | 1 881 188 A1 | 1/2008 |
| JP | 2004-036561 A | 2/2004 |

(Continued)

*Primary Examiner* — Willis R Wolfe, Jr.
(74) *Attorney, Agent, or Firm* — Sughrue Mion, PLLC

(57) ABSTRACT

A stop-start control apparatus for a port injection engine (1) including cylinders (2) stops the engine (1) by stopping fuel injection from each injector (13), when a predetermined stop condition is fulfilled. An estimated position of a piston (5) in each cylinder (2) after the engine (1) is stopped is determined during a stop process period from when the predetermined stop condition is fulfilled until when the engine (1) is stopped, and a compression stroke cylinder in which the piston (5) is to be stopped in a compression stroke is identified. An amount of fuel to be injected from the injector (13) for the compression stroke cylinder during the stop process period is set based on the estimated position of the piston (5) in the compression stroke cylinder. The injector (13) injects the fuel in the set fuel amount so that the fuel is contained in the compression stroke cylinder when the engine is stopped.

16 Claims, 17 Drawing Sheets

FOREIGN PATENT DOCUMENTS

| | | | | |
|---|---|---|---|---|
| JP | 2005163661 A * | 6/2005 | ................... | 701/112 |
| JP | 2005-299445 A | 10/2005 | | |
| JP | 2005-307826 A | 11/2005 | | |
| JP | 2006-283652 A | 10/2006 | | |
| JP | 2007-092732 A | 4/2007 | | |
| WO | 2006/043679 A1 | 4/2006 | | |
| WO | 2006/062250 A1 | 6/2006 | | |
| WO | 2006/134439 A1 | 12/2006 | | |

* cited by examiner

STOP-START CONTROL APPARATUS AND METHOD FOR AN INTERNAL COMBUSTION ENGINE

BACKGROUND OF THE INVENTION

1. Field of the Invention

The invention relates to a stop-start control apparatus for an internal combustion engine, which stops the internal combustion engine in a manner such that fuel is contained in a cylinder, and starts the internal combustion engine by igniting the fuel contained in the cylinder.

2. Description of the Related Art

Japanese Patent Application Publication No. 2004-36561 (JP-A-2004-36561) describes an automatic stop-start apparatus for an in-cylinder injection internal combustion engine. When a predetermined stop condition is fulfilled, the automatic stop-start apparatus executes an idling stop control that automatically stops the internal combustion engine. When a predetermined restart condition is fulfilled, the automatic stop-start apparatus executes a control so that fuel is injected into a cylinder in an intake stroke.

Because the apparatus described in the publication No. 2004-36561 is applied to the in-cylinder injection internal combustion engine, it is possible to supply the fuel into the cylinder in the compression stroke, even after the internal combustion engine is stopped. However, in a so-called port injection internal combustion engine in which the fuel injected into an intake port, it is not possible to supply the fuel into the cylinder in the compression stroke after the internal combustion engine is stopped, because an intake valve in the cylinder in the compression stroke is maintained in a closed state when the internal combustion engine is stopped, as is generally known. Therefore, in the port injection internal combustion engine, the fuel needs to be supplied when the internal combustion engine is to be stopped so that the fuel is contained in the cylinder in the compression stroke when the internal combustion engine is stopped. Also, if the amount of the fuel, which is supplied to the cylinder in the combustion stroke when the internal combustion engine is stopped, is not appropriately adjusted according to the amount of air in the cylinder, the startability of the internal combustion engine may be deteriorated. For example, if the amount of the supplied fuel is excessively large with respect to the amount of air, excessive large torque may be generated, and vibrations may be generated at the time of start of the engine, or exhaust emissions may be deteriorated at the time of start of the engine. If the amount of the supplied fuel is insufficient with respect to the amount of air, the fuel may not be appropriately combusted, and appropriate torque may not be generated.

SUMMARY OF THE INVENTION

The invention provides a stop-start control apparatus and a stop-start control method for an internal combustion engine, which make it possible to appropriately generate torque required to start the internal combustion engine, and to smoothly start the internal combustion engine, thereby improving the startability of the internal combustion engine.

A first aspect of the invention relates to a stop-start control apparatus for an internal combustion engine that includes a plurality of cylinders, and fuel injection valves provided in intake ports for the respective cylinders. The stop-start control apparatus stops the internal combustion engine by stopping injection of fuel from each of the fuel injection valves, when a predetermined stop condition is fulfilled. The stop-start control apparatus includes: cylinder identification means for determining an estimated position of a piston in each of the cylinders, which is a position at which the piston in each of the cylinders is estimated to be located when the internal combustion engine is stopped, during a stop process period from when the predetermined stop condition is fulfilled until when the internal combustion engine is stopped, and identifying a compression stroke cylinder in which the piston is to be stopped in a compression stroke, based on the estimated position of the piston in each of the cylinders; fuel amount setting means for setting a fuel amount that is an amount of the fuel to be injected from the fuel injection valve provided in the intake port for the compression stroke cylinder during the stop process period, based on the estimated position of the piston in the compression stroke cylinder, which is determined by the cylinder identification means; and preliminary injection control means for executing a preliminary injection control that causes the fuel injection valve provided in the intake port for the compression stroke cylinder to inject the fuel in the fuel amount set by the fuel amount setting means in a last intake stroke or before the last intake stroke during the stop process period so that the fuel is contained in the compression stroke cylinder when the internal combustion engine is stopped.

With the stop-start control apparatus according to the first aspect of the invention, the estimated position, at which the piston in each of the cylinders is to be located when the internal combustion engine is stopped, is determined during the stop process period. Therefore, it is possible to identify the compression stroke cylinder in which the piston is to be stopped in the compression stroke when the internal combustion engine is stopped. Also, the amount of the fuel to be supplied to the compression stroke cylinder during the stop process period is set based on the estimated position of the piston in the compression stroke cylinder. Therefore, the compression stroke cylinder contains the fuel in an appropriate amount corresponding to the amount of air contained in the compression stork cylinder. Thus, by combusting the fuel contained in the compression stroke cylinder at the time of start of the internal combustion engine, it is possible to appropriately generate the torque required to start the internal combustion engine, and to smoothly start the internal combustion engine. Thus, the startability of the internal combustion engine is improved.

In the stop-start control apparatus according to the first aspect of the invention, the fuel amount setting means may set the fuel amount so that the fuel amount decreases as the estimated position of the piston in the compression stroke cylinder, which is determined by the cylinder identification means, becomes closer to a top dead center. As is generally known, the amount of the air contained in the compression stroke cylinder decreases, as the position of the piston becomes closer to the top dead center. Therefore, by setting the fuel amount in the above-described manner, it is possible to appropriately set the amount of the fuel to be contained in the compression stroke cylinder when the internal combustion engine is stopped, according to the amount of the air contained in the compression stroke cylinder.

The stop-start control apparatus according to the first aspect of the invention may further include: rotational speed determination means for determining a rotational speed of a crankshaft of the internal combustion engine; and storage means for storing a map indicating a corresponding relation between a rotational speed of the internal combustion engine in a predetermined crank angle range during the stop process period, and the position of the piston in each of the cylinders when the internal combustion engine is stopped. The cylinder identification means may determine the estimated position of the piston in each of the cylinders when the internal combustion engine is stopped, based on the map, and the rotational speed in the predetermined crank angle range during the stop process period, which is determined by the rotational speed determination means. After the fuel supply to each of the cylinders is stopped, the crankshaft is rotated due to inertia, and then, stopped. It is possible to determine the inertia of the crankshaft, based on the rotational speed of the crankshaft when the fuel supply is stopped. Therefore, it is possible to estimate the crank angle at which the crankshaft is to be stopped when the crankshaft is stopped, based on the rotational speed of the crankshaft. As is generally known, the crank angle is related with the position of the piston in each of the cylinders. Accordingly, the map indicating the corresponding relation between the rotational speed in the predetermined crank angle range, and the position of the piston when the internal combustion engine is stopped is stored in advance. The estimated position of the piston in each of the cylinders when the internal combustion engine is stopped is determined based on the map. Thus, it is possible to easily determine the estimated position of the piston in each of the cylinders when the internal combustion engine is stopped.

In the above-described aspect, the predetermined crank angle range may be a crank angle range corresponding to a late stage of a stroke in which the piston in each of the cylinders moves from a bottom dead center (BDC) to a top dead center (TDC). As is generally known, when the piston is at the top dead center, the speed of the piston is zero. Therefore, acceleration of the piston is decreased in the late stage of the stroke in which the piston moves from the bottom dead center to the top dead center. Also, in the compression stroke that is one of the stroke in which the piston moves from the bottom dead center to the top dead center, air in the cylinder is compressed by the piston, and therefore, the acceleration of the piston tends to be further decreased. When the acceleration of the piston is decreased, an amount of change in the rotational speed of the crankshaft is decreased. At this timing, it is possible to accurately detect the rotational speed of the crankshaft. Thus, by setting the predetermined crank angle range to such a crank angle range, it is possible to increase the accuracy of estimating the position of the piston in each of the cylinders when the internal combustion engine is stopped.

The cylinder identification means may include correction means for correcting the corresponding relation in the map, based on at least one of a temperature of a coolant for the internal combustion engine, a temperature of oil for the internal combustion engine, an opening amount of a throttle valve of the internal combustion engine, a state of clutch means for connecting/disconnecting the internal combustion engine to/from a transmission, and an atmospheric pressure. The temperature of the coolant for the internal combustion engine and the temperature of oil for the internal combustion engine are correlated with the friction of the internal combustion engine. The atmospheric pressure and the opening amount of the throttle valve are correlated with pumping loss of the internal combustion engine. Further, the state of the clutch means is correlated with the inertia energy of the crankshaft of the internal combustion engine. The friction, the pumping loss, and the inertia energy influence the stop timing of the crankshaft that is rotated due to inertia after the fuel supply to each of the cylinders is stopped. For example, when the friction and the pumping loss increase, the crankshaft is stopped early. When the inertia energy increases, the stop timing of the crankshaft is retarded. Thus, these parameters influence the stop timing of the crankshaft, and also influence the crank angle at which the crankshaft is stopped. Therefore, by correcting the corresponding relation in the map based on values of these parameters, it is possible to further increase the accuracy of estimating the position of the piston in each of the cylinders when the internal combustion engine is stopped.

The stop-start control apparatus according to the first aspect of the invention may further include: piston position determination means for determining the position of the piston in each of the cylinders when the internal combustion engine is stopped; and learning means for correcting the corresponding relation in the map stored in the storage means, based on a difference between the position of the piston in each of the cylinders determined by the piston position determination means after the internal combustion engine is stopped due to fulfillment of the predetermined stop condition, and the estimated position of the piston in each of the cylinders determined by the cylinder identification means. For example, the friction at each portion of the internal combustion engine gradually changes according to the operating time of the internal combustion engine. Thus, by correcting the corresponding relation in the map based on the difference between the position of the piston thus estimated and the position of the piston that is actually stopped, it is possible to correct the corresponding relation in the map to the corresponding relation appropriate for the internal combustion engine. Thus, it is possible to further increase the accuracy of estimating the position of the piston in each of the cylinders when the internal combustion engine is stopped.

The stop-start control apparatus according to the first aspect of the invention may further include preliminary injection control prohibition means for prohibiting execution of the preliminary injection control, if the cylinder identification means estimates that the piston in the compression stroke cylinder is to be stopped in a predetermined late stage crank angle range corresponding to a late stage of the compression stroke when the internal combustion engine is stopped. Thus, in the late stage of the compression stroke, the piston has moved to a position near the top dead center. Therefore, air is hardly contained in the compression stroke cylinder. In this case, even if the fuel is contained in the compression stroke cylinder, and the fuel is combusted at the time of start of the internal combustion engine, a misfire may occur, or torque may be hardly generated. Accordingly, in this case, execution of the preliminary injection control is prohibited. This prevents unnecessary consumption of the fuel.

The stop-start control apparatus according to the first aspect of the invention may further include: coolant temperature determination means for determining a temperature of a coolant for the internal combustion engine; and self ignition prevention means for prohibiting execution of the preliminary injection control, if the temperature of the coolant determined by the coolant temperature determination means is higher than a determination temperature, and the cylinder identification means estimates that the piston in the compression stroke cylinder is to be stopped in a predetermined early stage crank angle range corresponding to an early stage of the compression stroke when the internal combustion engine is stopped. When the temperature of the internal combustion engine is high, and a large amount of air is contained in the compression stroke cylinder, the air contained in the compression stroke cylinder may be heated by the heat of the internal combustion engine, and thus, the fuel may be self-ignited. Accordingly, in this case, the execution of the preliminary injection control is prohibited. This prevents self-ignition of the fuel in the compression stroke cylinder.

In the stop-start control apparatus according to the first aspect of the invention, the internal combustion engine may be a spark ignition internal combustion engine in which ignition plugs are provided for the respective cylinders. The stop-start control apparatus may further include start control means for starting the internal combustion engine when a predetermined start condition is fulfilled, and ignition timing correction means for correcting an ignition timing for the compression stroke cylinder at a time of start of the internal combustion engine, based on the position of the piston in the compression stroke cylinder. The torque generated in the compression stroke cylinder at the time of start of the internal combustion engine is correlated with the amount of the air contained in the compression stroke cylinder. Therefore, the amount of the air increases, the generated torque increases. The torque is adjusted by changing the ignition timing. In this configuration, because the ignition timing is corrected based on the position of the piston in the compression stroke cylinder, it is possible to appropriately control the torque generated in the compression stroke cylinder at the time of start of the internal combustion engine. Therefore, it is possible to appropriately generate the torque required to start the internal combustion engine, and to smoothly start the internal combustion engine.

In the above-described aspect, the ignition correction means may advance the ignition timing for the compression stroke cylinder, as the position of the piston in the compression stroke cylinder becomes closer to a top dead center. As the position of the piston in the compression stroke cylinder becomes closer to the top dead center, the amount of the air contained in the compression stroke cylinder decreases, and therefore, the torque generated in the compression stroke cylinder at the time of start of the internal combustion engine decreases. Accordingly, as the position of the piston becomes closer to the top dead center, the ignition timing is advanced to increase the torque generated in the compression stroke cylinder. Thus, the torque required to start the internal combustion engine is appropriately generated in the compression stroke cylinder.

A second aspect of the internal combustion engine relates to a stop-start control apparatus for a spark ignition internal combustion engine that includes a plurality of cylinders, and ignition plugs provided for the respective cylinders. When a predetermined stop condition is fulfilled, the stop-start control apparatus stops the internal combustion engine in a manner such that fuel is contained in a compression stroke cylinder in which a piston is stopped in a compression stroke when the internal combustion engine is stopped. When a predetermined start condition is fulfilled, the stop-start control apparatus starts the internal combustion engine by igniting the fuel contained in the compression stroke cylinder. The stop-start control apparatus includes: piston position determination means for determining a position of the piston in the compression stroke cylinder when the internal combustion engine is stopped; and ignition timing correction means for correcting an ignition timing for the compression stroke cylinder at a time of start of the internal combustion engine, based on the position of the piston determined by the piston position determination means, when the predetermined start condition is fulfilled.

In the stop-start control apparatus according to the second aspect of the invention, the ignition timing is corrected based on the position of the piston in the compression stroke cylinder at the time of start of the internal combustion engine. Therefore, it is possible to appropriately adjust the ignition timing according to the amount of the air contained in the compression stroke cylinder. Thus, it is possible to appropriately control the torque generated in the compression stroke cylinder at the time of start of the internal combustion engine, to appropriately generate the torque required to start the internal combustion engine, and to smoothly start the internal combustion engine. Accordingly, the startability of the internal combustion engine is improved.

In the stop-start control apparatus according to the second aspect of the invention, the ignition timing correction means may advance the ignition timing for the compression stroke cylinder, as the position of the piston determined by the piston position determination means becomes closer to a top dead center. As described above, as the position of the piston in the compression stroke cylinder becomes closer to the top dead center, the torque generated in the compression stroke cylinder decreases. Therefore, by correcting the ignition timing in the above-described manner, the torque required to start the internal combustion engine is appropriately generated in the compression stroke cylinder.

A third aspect of the invention relates to a stop-start control method for an internal combustion engine that includes a plurality of cylinders, and fuel injection valves provided in intake ports for the respective cylinders. The stop-start control method includes: determining whether a predetermined stop condition is fulfilled; stopping injection from each of the fuel injection valves, when the predetermined stop condition is fulfilled; determining an estimated position of a piston in each of the cylinders, which is a position at which the piston in each of the cylinders is estimated to be located when the internal combustion engine is stopped, during a stop process period from when the predetermined stop condition is fulfilled until when the internal combustion engine is stopped; identifying a compression stroke cylinder in which the piston is to be stopped in a compression stroke, based on the estimated position of the piston in each of the cylinders; setting a fuel amount that is an amount of the fuel to be injected from the fuel injection valve provided in the intake port for the compression stroke cylinder during the stop process period, based on the estimated position of the piston in the compression stroke cylinder; and executing a preliminary injection control that causes the fuel injection valve provided in the intake port for the compression stroke cylinder to inject the fuel in the set fuel amount in a last intake stroke or before the last intake stroke during the stop process period so that the fuel is contained in the compression stroke cylinder when the internal combustion engine is stopped.

In the stop-start control method according to the third aspect of the invention, the estimated position, at which the piston in each of the cylinders is to be located when the internal combustion engine is stopped, is determined during the stop process period. Therefore, it is possible to identify the compression stroke cylinder in which the piston is to be stopped in the compression stroke when the internal combustion engine is stopped. Also, the fuel amount that is the amount of the fuel to be supplied to the compression stroke cylinder during the stop process period is set based on the estimated position of the piston in the compression stroke cylinder. Therefore, the compression stroke cylinder contains the fuel in an appropriate amount corresponding to the amount of the air contained in the compression stork cylinder. Thus, by combusting the fuel contained in the compression stroke cylinder at the time of start of the internal combustion engine, it is possible to appropriately generate the torque required to start the internal combustion engine, and to smoothly start the internal combustion engine. Thus, the startability of the internal combustion engine is improved.

A fourth aspect of the invention relates to a stop-start control method for a spark ignition internal combustion engine that includes a plurality of cylinders, and ignition plugs provided for the respective cylinders. The stop-start control method includes: stopping the internal combustion engine when a predetermined stop condition is fulfilled, in a manner such that fuel is contained in a compression stroke cylinder in which a piston is stopped in a compression stroke when the internal combustion engine is stopped; determining a position of the piston in the compression stroke cylinder when the internal combustion engine is stopped; correcting an ignition timing for the compression stroke cylinder at a time of start of the internal combustion engine, based on the determined position of the piston, when a predetermined start condition is fulfilled; and starting the internal combustion engine by igniting the fuel contained in the compression stroke cylinder, based on the corrected ignition timing.

In the stop-start control method according to the fourth aspect of the invention, the ignition timing is corrected based on the position of the piston in the compression stroke cylinder at the time of start of the internal combustion engine. Therefore, it is possible to appropriately adjust the ignition timing according to the amount of the air contained in the cylinder. Thus, it is possible to appropriately control the torque generated in the compression stroke cylinder at the time of start of the internal combustion engine, to appropriately generate the torque required to start the internal combustion engine, and to smoothly start the internal combustion engine. Thus, the startability of the internal combustion engine is improved.

As described above, in the stop-start control apparatus and the stop-start control method according to the invention, the fuel injection amount during the preliminary injection control and the ignition timing are adjusted based on the position of the piston in the compression stroke cylinder. Therefore, the torque required to start the internal combustion engine is appropriately generated in the compression stroke cylinder at the time of start of the internal combustion engine. Therefore, it is possible to smoothly start the internal combustion engine, and to improve the startability of the internal combustion engine.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
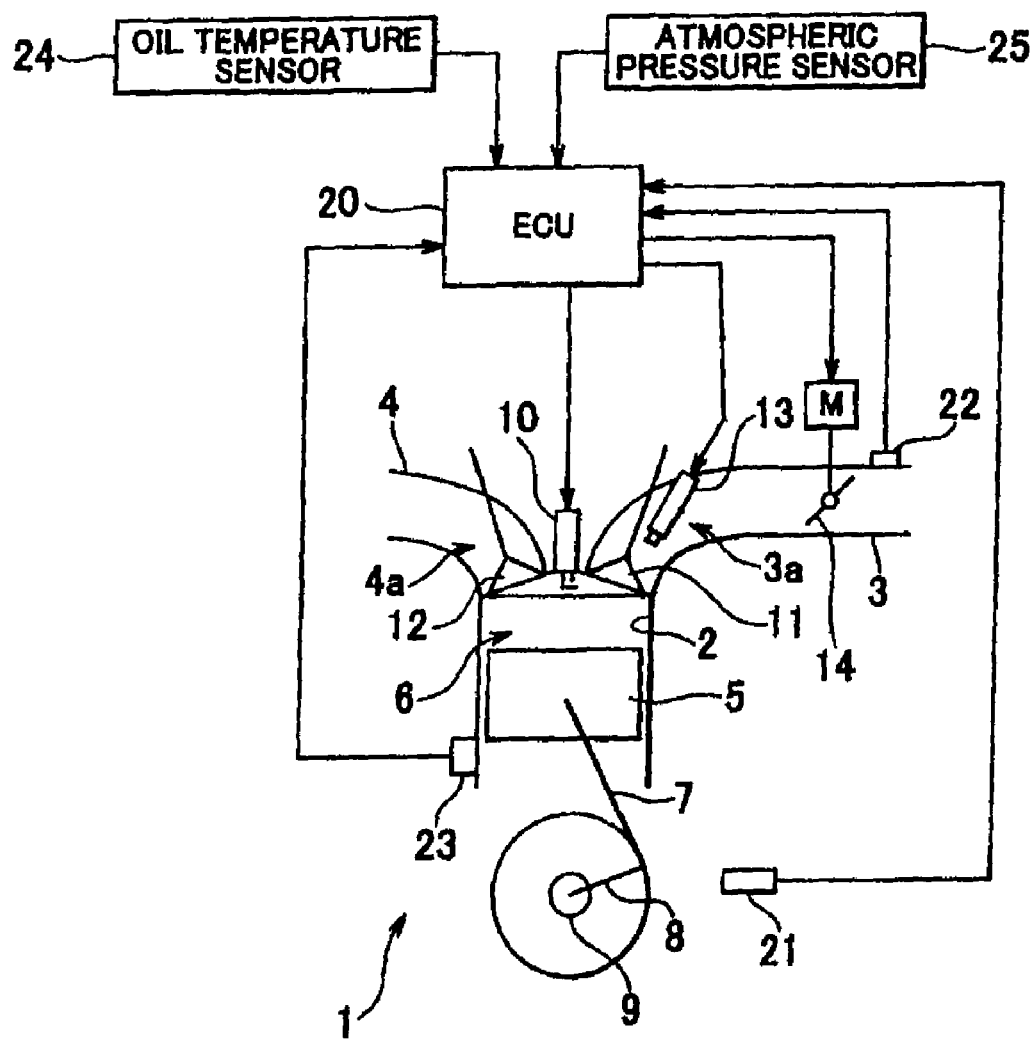
FIG. 1 is a diagram schematically showing an internal combustion engine provided with a stop-start control apparatus according to an embodiment of the invention.

FIG. 1 is a diagram schematically showing an internal combustion engine provided with a stop/start control apparatus according to an embodiment of the invention. In FIG. 1, an internal combustion engine (hereinafter, simply referred to as "engine") 1 is provided in a vehicle as a power source for driving the vehicle. The engine 1 includes four cylinders 2 (only one cylinder is shown in FIG. 1), and an intake passage 3 and an exhaust passage 4 that are connected to each cylinder 2. A piston 5 is inserted in each cylinder 2 to reciprocate in the cylinder 2. In each cylinder 2, a combustion chamber 6 is formed by the piston 5 and a wall surface of the cylinder 2. Each piston 5 is connected to a crankshaft 9 by a connecting rod 7 and a crank arm 8. The phases of the pistons 5 in each pair of the cylinders 2 differ from each other by a crank angle of 180 degrees. An ignition plug 10, an intake valve 11, and an exhaust valve 12 are provided for each cylinder 2. The ignition plug 10 is disposed on a substantially center line of the cylinder 2 in a manner such that an electrode portion protrudes into the cylinder 2. The intake valve 11 opens/closes an intake port 3a that forms a part of the intake passage 3. The exhaust valve 12 opens/closes an exhaust port 4a that forms a part of the exhaust passage 4. An injector 13, which may be regarded as a fuel injection valve, is provided in each intake port 3a. Thus, the engine 1 is configured as a port injection engine. A throttle valve 14, which adjusts an intake air amount, is provided in the intake passage 3. The configuration of the engine 1 is the same as that of a known engine, and therefore, the detailed description thereof will be omitted.

An engine control unit (ECU) 20 controls operation of each injector 13 and operation of each ignition plug 10. The ECU 20 is configured as a computer that includes a microprocessor, and peripheral devices required for the operation of the microprocessor, such as a RAM and a ROM. The ECU 20 executes processes required for controlling the operating state of the engine 1 according to programs stored in the ROM. For example, the ECU 20 detects a rotational speed and an intake air amount of the engine 1 based on signals output from predetermined sensors, and controls an amount of fuel injected from the injector 13 so that an actual air-fuel ratio becomes equal to a predetermined air-fuel ratio. When the ECU 20 executes the controls, the ECU 20 refers to the signals output from the sensors provided in the engine 1. For example, the ECU 20 refers to the signals output from a crank angle sensor 21, an airflow meter 22, a coolant temperature sensor 23, an oil temperature sensor 24, and an atmospheric pressure sensor 25. The crank angle sensor 21 outputs a signal corresponding to the phase (crank angle) of the crankshaft 9. The airflow meter 22 outputs a signal corresponding to the intake air amount. The coolant temperature sensor 23 outputs a signal corresponding to a temperature of a coolant for the engine 1, and may be regarded as the coolant temperature determination means. The oil temperature sensor 24 outputs a signal corresponding to a temperature of oil for the engine 1. The atmospheric temperature sensor 25 outputs a signal corresponding to an atmospheric pressure. Although not shown in the figures, other sensors are connected to the ECU 20.

When a predetermined stop condition is fulfilled, the ECU 20 stops fuel injection to the engine 1 to stop the operation of the engine 1. When a predetermined restart condition is fulfilled, the ECU 20 restarts the engine 1. That is, the ECU 20 executes a so-called idling stop control for the engine 1. The predetermined stop condition is fulfilled, for example, when a brake pedal continues to be operated, and the vehicle speed continues to be 0 for a predetermined period. If the vehicle includes an automatic transmission, the restart condition is fulfilled, for example, when the brake pedal is released. If the vehicle includes a manual transmission, the restart condition is fulfilled, for example, when a shift lever is moved from a neutral position to a first gear position, and a clutch pedal is depressed. The stop condition and the restart condition may be set in the same manner as in known technologies relating to the idling stop control.

Also, the ECU 20 executes a preliminary injection control that causes the injector 13 to inject fuel during a stop process period from when the predetermined stop condition is fulfilled until when the engine 1 is stopped so that the fuel is contained in a cylinder that is in a compression stroke when the engine 1 is stopped (hereinafter, this cylinder will be referred to as "compression stroke cylinder"). When the predetermined restart condition is fulfilled, the ECU 20 operates the ignition plug 10 for the compression stroke cylinder to combust the fuel contained in the compression stroke cylinder. Thus, the engine 1 is restarted.

Figure 2:
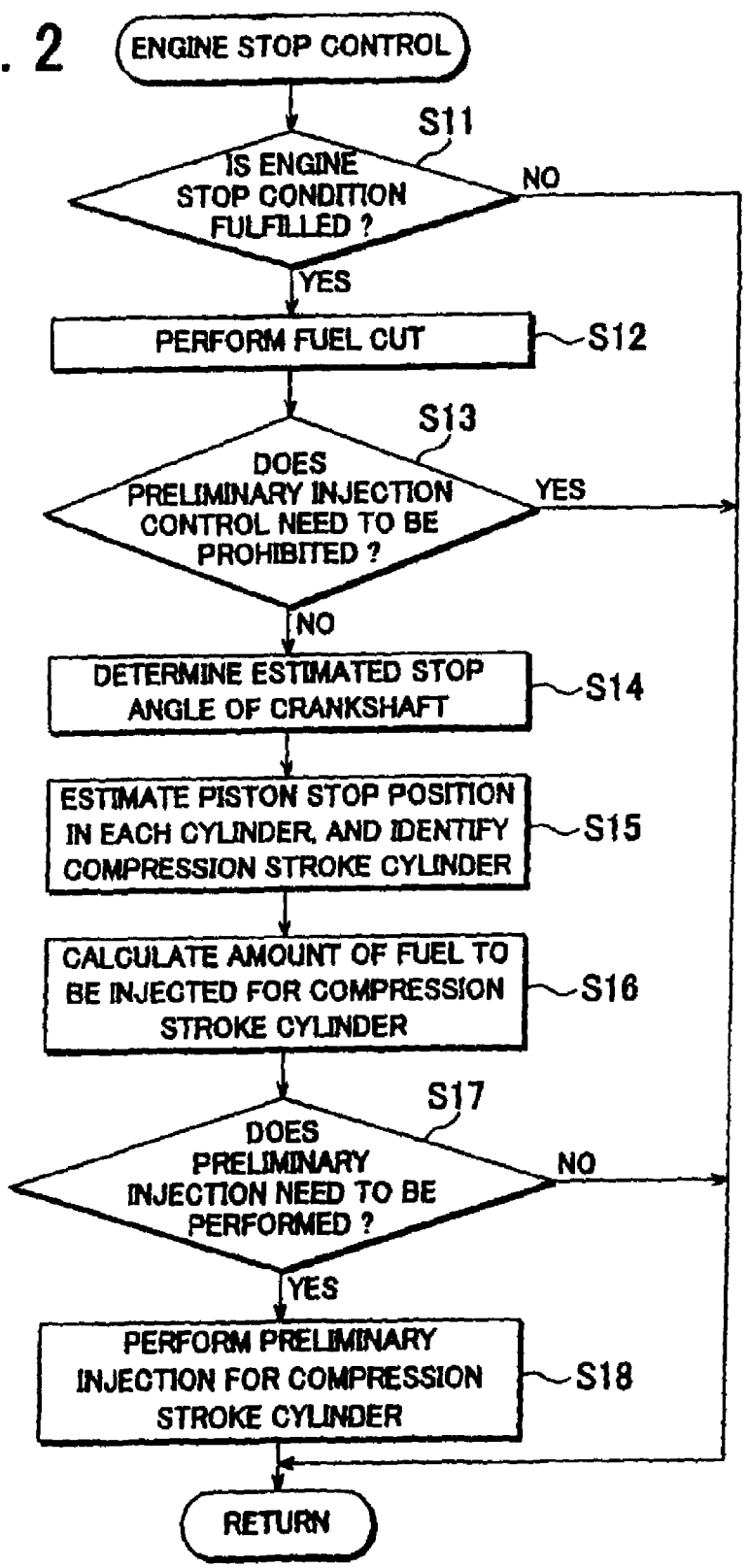
FIG. 2 is a flowchart showing an engine stop control routine executed by an ECU in FIG. 1.

FIG. 2 shows an engine stop control routine executed by the ECU 20 to stop the engine 1 during the idling stop control when the engine 1 is operated. The control routine shown in FIG. 2 is repeatedly executed at predetermined time intervals when the engine 1 is operated. By executing the control routine, the ECU 20 may be regarded as the preliminary injection control means according to the invention.

In the control routine shown in FIG. 2, first, in step S11, the ECU 20 determines whether the predetermined stop condition for stopping the engine 1 is fulfilled. When it is determined that the stop condition is not fulfilled, the current control routine is finished. When it is determined that the stop condition is fulfilled, the routine proceeds to step S12. In step S12, the ECU 20 cuts off fuel supply, that is, stops fuel injection from each injector 13. Subsequently, in step S13, the ECU 20 determines whether execution of the preliminary injection control needs to be prohibited. For example, when a malfunction is detected in a device in an injection system, such as the injector 13, or a device in an ignition system, such as the ignition plug 10, the ECU 20 determines that the execution of the preliminary injection control needs to be prohibited. When the ECU 20 determines that the execution of the preliminary injection control needs to be prohibited, the ECU 20 finishes the current control routine.

When the ECU 20 determines that the preliminary injection control needs to be executed, the routine proceeds to step S14. In step S14, the ECU 20 determines a crank angle at which the crankshaft 9 is to be stopped when the engine 1 is stopped (hereinafter, this crank angle may be referred to as "estimated stop angle"). A method of determining the estimated stop angle will be described with reference to FIG. 3. After the fuel supply is cut off, the rotational speed of the crankshaft 9 is gradually decreased, and finally, the crankshaft 9 is stopped. At this time, the crank angle at which the crankshaft 9 is stopped varies depending on inertia of the crankshaft 9 when the fuel supply is cut of The decrease in the inertia is correlated with the decrease in the rotational speed of the crankshaft 9 until the crankshaft 9 is stopped. Therefore, the estimated stop angle can be determined based on the rotational speed of the crankshaft 9 after the fuel supply is cut off. Thus, the ECU 20 repeatedly executes a crankshaft stop angle estimation routine shown in FIG. 3 at predetermined time intervals to determine the estimated stop angle, in parallel with other routines executed by the ECU 20.

Figure 3:
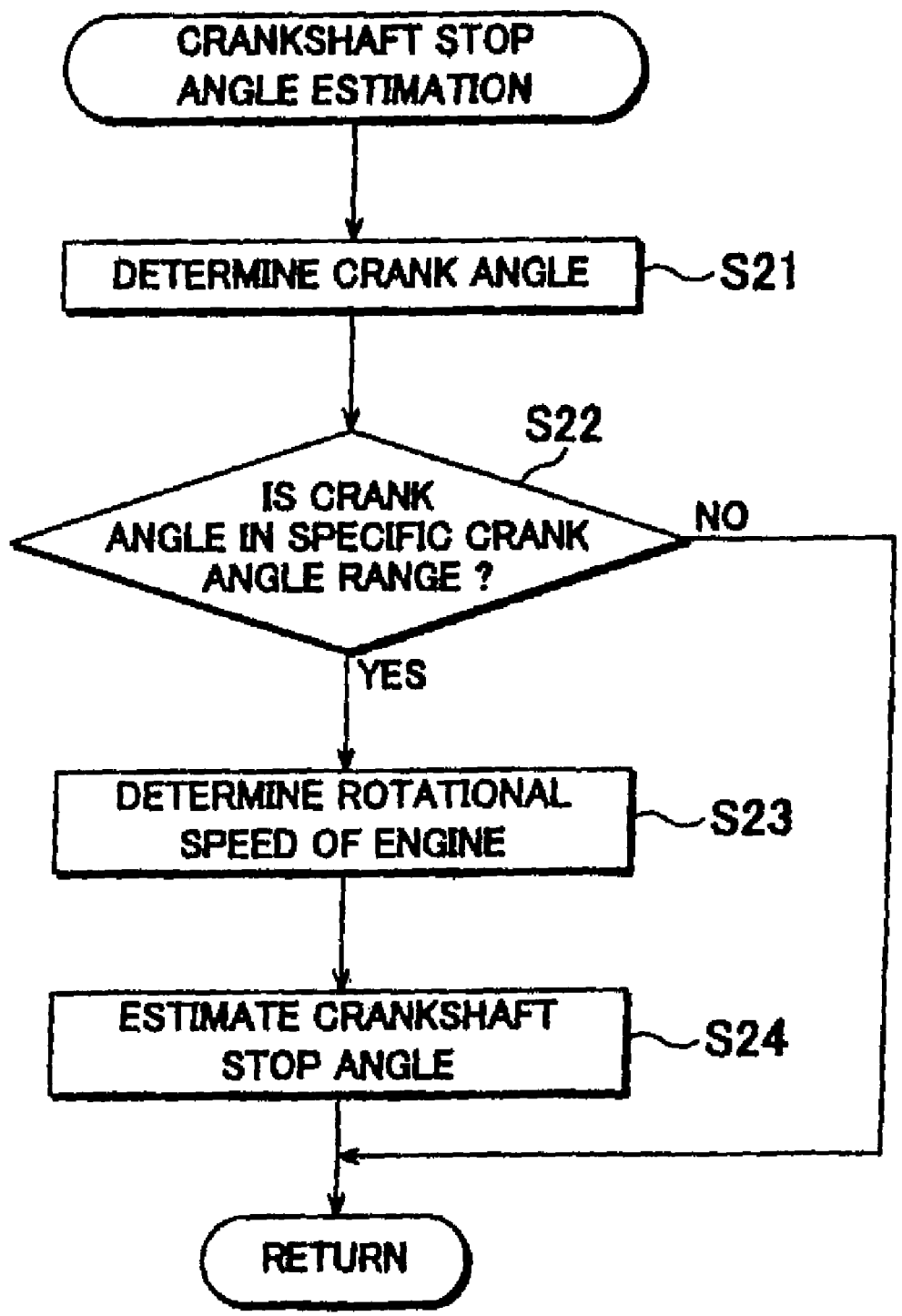
FIG. 3 is a flowchart showing a crankshaft stop angle estimation routine executed by the ECU in FIG. 1.

The routine will be described with reference to FIG. 3. In the routine shown in FIG. 3, first, in step S21, the ECU 20 determines a crank angle referring to the signal output from the crank angle sensor 21. Next, in step S22, the ECU 20 determines whether the determined crank angle is in a specific crank angle range. For example, the specific crank angle range is set to a crank angle range corresponding to the late stage of a stroke during which each of the four pistons 5 moves from a bottom dead center (BDC) to a top dead center (TDC), that is, a compression stroke or an exhaust stroke. When the crank angle is in the crank angle range, the speed of the piston 5 is decreased, and thus, the rotational speed of the crankshaft 9 fluctuates to a small extent. Therefore, it is possible to accurately detect the rotational speed of the crankshaft 9. When it is determined that the determined crank angle is not in the specific crank angle range, the current routine is finished.

Figure 4:
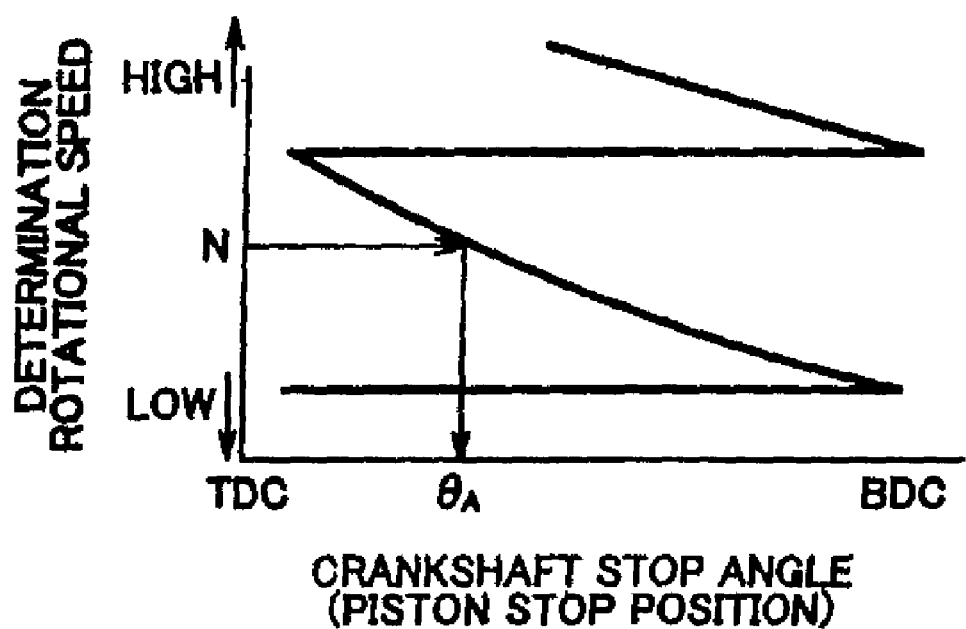
FIG. 4 is a diagram showing an example of a corresponding relation between a crankshaft stop angle and a determination rotational speed.

When it is determined that the determined crank angle is in the specific crank angle range, the routine proceeds to step S23. In step S23, the ECU 20 determines the rotational speed of the engine 1, that is, the rotational speed of the crankshaft 9. The rotational speed of the crankshaft 9 is determined based on the signal output from the crank angle sensor 21. Thus, the crank angle sensor 21 may be regarded as the rotational speed determination means according to the invention. Subsequently, in step S24, the ECU 20 estimates the crankshaft stop angle (i.e., the ECU 20 determines the estimated stop angle) based on the determined rotational speed of the engine 1 (hereinafter, may be referred to as "determination rotational speed"). The estimated stop angle is determined based on the relation between the crankshaft stop angle (estimated stop angle) and the determination rotational speed shown as in FIG. 4. The relation shown in FIG. 4 is determined in advance through experiment or the like, and a map indicating the relation is stored in the RAM of the ECU 20. Thus, the ECU 20 may be regarded as the storage means according to the invention. As described above, after the fuel supply is cut off, the crankshaft 9 is rotated due to inertia, and the inertia is gradually decreased, and then, the crankshaft 9 is stopped. The decrease in the inertia depends on friction at each portion of the engine 1 and pumping loss. Therefore, by determining the relation between the rotational speed when the crank angle is in the specific crank angle range, and the estimated stop angle, the estimated stop angle can be determined based on the relation. In the map shown in FIG. 4, for example, when the rotational speed of the crankshaft 9 is a rotational speed N, the estimated stop angle is determined to be angle $\theta_A$. Then, the current routine is finished. The estimated stop angle that is determined is stored in the RAM of the ECU 20 until the estimated stop angle is determined next time.

Referring to FIG. 2 again, after the estimated stop angle of the crankshaft 9 is determined in step S14, the routine proceeds to step S15. In step S15, the ECU 20 determines an estimated position at which the piston 5 in each cylinder 2 is to be located when the engine 1 is stopped. Based on the estimated stop position of the piston 5 in each cylinder 2, the compression stroke cylinder is identified. By executing this process, the ECU 20 may be regarded as the cylinder identification means according to the invention. As is generally known, the crank angle is determined using a reference crank angle when the pistons 5 in the four cylinders 2 are in predetermined positions (for example, when the piston 5 in one of the cylinders 2 is at a top dead center of the intake stroke). Therefore, by determining the crank angle, it is possible to determine the position of the piston 5 in each cylinder 2. Thus, by determining the position of the piston 5 in each cylinder 2, it is possible to identify the compression stroke cylinder.

Figure 5:
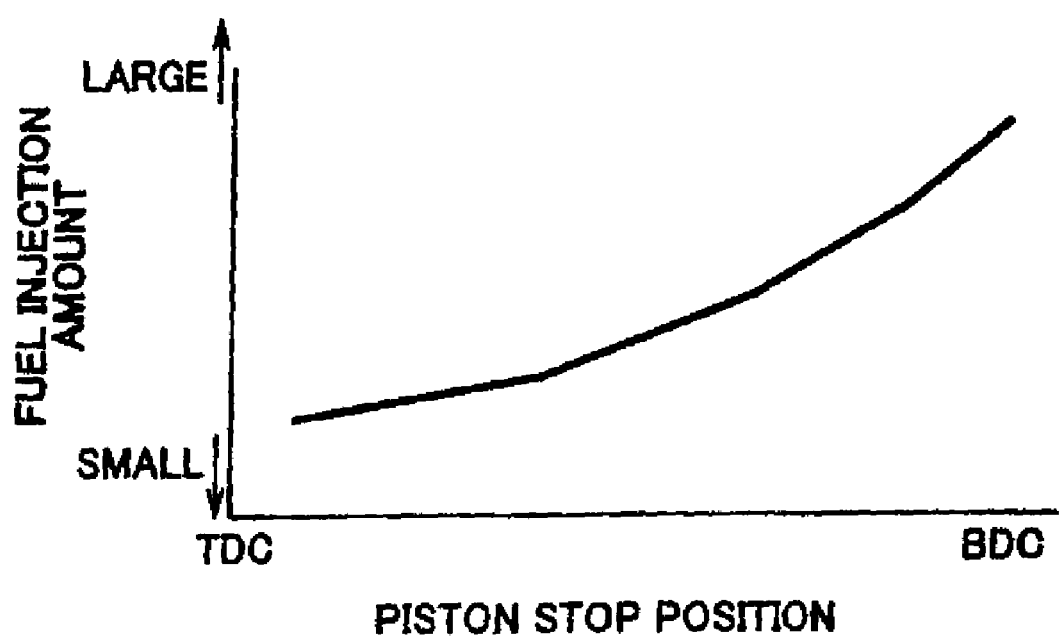
FIG. 5 is a diagram showing an example of a relation between a piston stop position in a compression stroke cylinder and a fuel injection amount.

Subsequently, in step S16, the ECU 20 calculates a fuel amount that is an amount of fuel to be injected from the injector 13 for the compression stroke cylinder during the preliminary injection control. The fuel amount is set based on a relation between the piston stop position and the fuel injection amount as shown in FIG. 5. As shown in FIG. 5, as the piston stop position becomes closer to the top dead center, the fuel amount is set to decrease. As the piston stop position becomes closer to the bottom dead center, the fuel amount is set to increase. By executing the process, the ECU 20 may be regarded as the fuel amount setting means according to the invention. Next, in step S17, the ECU 20 determines whether the preliminary injection control needs to be executed. In the preliminary injection control, the fuel needs to be contained in the compression stroke cylinder when the engine 1 is stopped. Therefore, the fuel needs to be injected in the intake stroke or before the intake stroke of the compression stroke cylinder before the rotation of the crankshaft 9 is stopped. Accordingly, the timing at which the preliminary injection control is executed is set so that the fuel is injected in the intake stroke or before the intake stroke of the compression stroke cylinder before the rotation of the crankshaft 9 is stopped. When it is determined that the preliminary injection control does not need to be executed, the current control routine is finished. When it is determined that the preliminary injection control needs to be executed, the routine proceeds to step S18. In step S18, the ECU 20 causes the injector 13 for the compression stroke cylinder to inject the fuel in the calculated fuel amount. That is, the ECU 20 executes the preliminary injection control. Then, the current control routine is finished.

By executing the control routine in FIG. 2, the estimated stop position, at which the piston 5 in the compression stroke cylinder is to be stopped, is determined during the stop process period, and the amount of the fuel to be injected during the preliminary injection control is set according to the estimated stop position of the piston 5. Therefore, the compression stroke cylinder contains the fuel in an appropriate amount corresponding to the amount of the air contained in the compression stroke cylinder when the engine 1 is stopped. Thus, by combusting the fuel contained in the compression stroke cylinder at the time of start of the engine 1, it is possible to appropriately generate torque required to smoothly start the engine 1. Thus, the startability of the engine 1 is improved.

Figure 6:
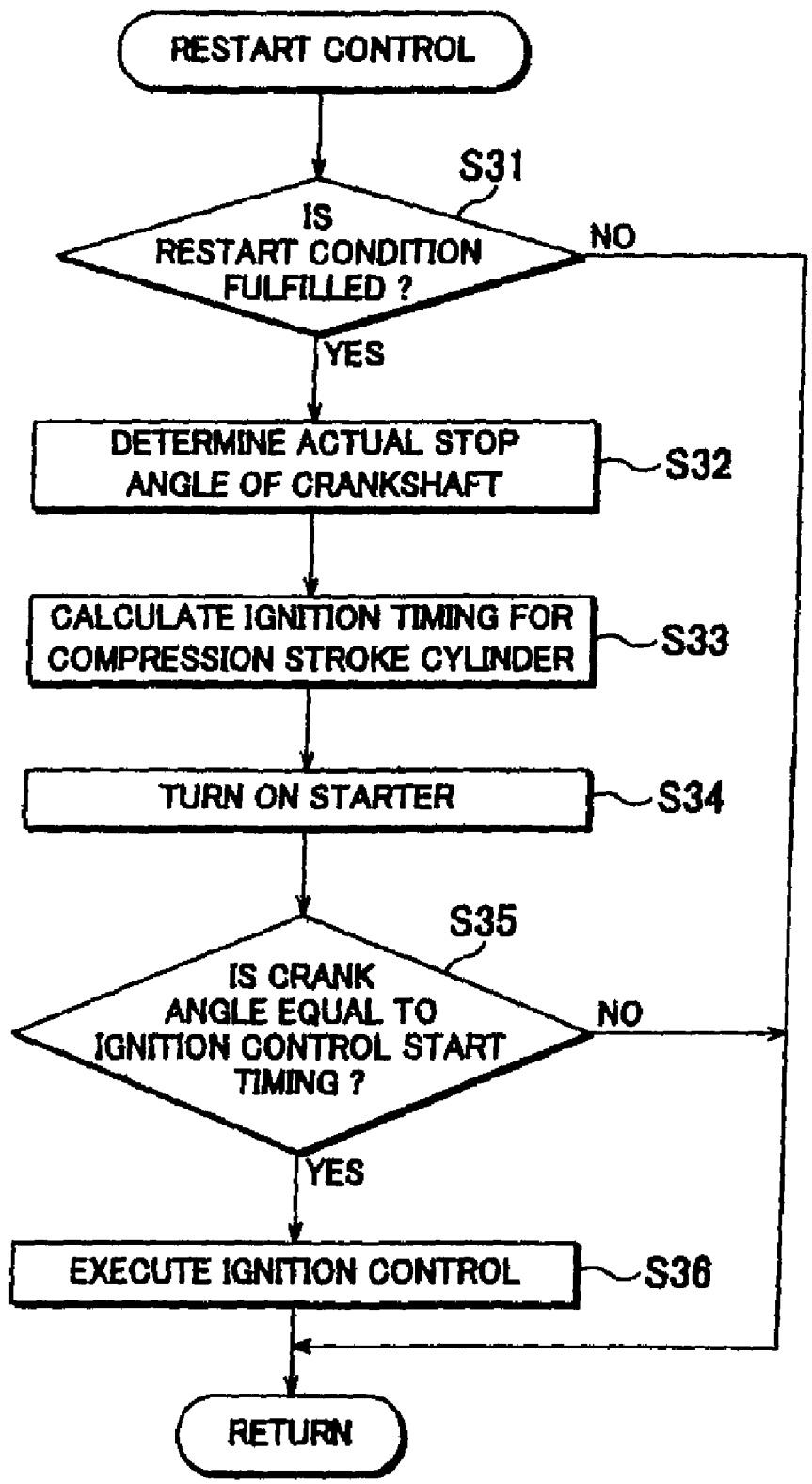
FIG. 6 is a flowchart showing a restart control routine executed by the ECU in FIG. 1.

FIG. 6 is a restart control routine executed by the ECU 20 to restart the engine 1 when the engine 1 is stopped due to fulfillment of the predetermined stop condition. The control routine in FIG. 6 is repeatedly executed at predetermined time intervals, regardless of whether the engine 1 is being operated. By executing the control routine, the ECU 20 may be regarded as the start control means according to the invention.

Figure 7:
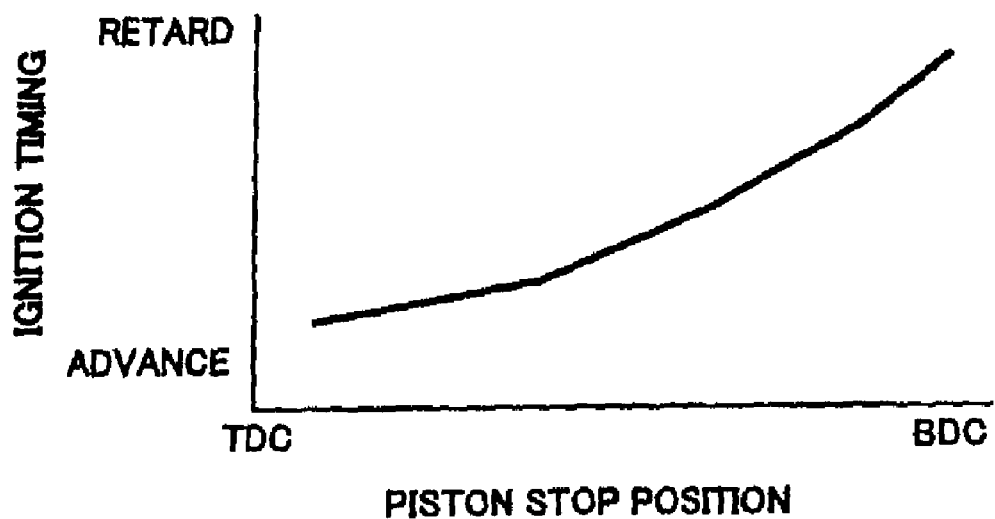
FIG. 7 is a diagram showing an example of a relation between the piston stop position in the compression stroke cylinder and an ignition timing.

In the control routine shown in FIG. 6, first, in step S31, the ECU 20 determines whether the predetermined restart condition is fulfilled. When it is determined that the restart condition is not fulfilled, the current control routine is finished. When it is determined that the restart condition is fulfilled, the routine proceeds to step S32. In step S32, the ECU 20 determines the angle of the crankshaft 9 of the engine 1 that is stopped, based on the signal output from the crank angle sensor 21 (hereinafter, this angle may be referred to as "actual stop angle"). Subsequently, in step S33, the ECU 20 calculates the ignition timing for the compression stroke cylinder, based on a relation between the piston stop position in the compression stroke cylinder and the ignition timing. The piston position in the compression stroke cylinder is calculated based on the determined actual stop angle. By calculating the piston position, the ECU 20 may be regarded as the piston position determination means according to the invention. As shown in FIG. 7, as the piston position in the compression stroke cylinder becomes closer to the top dead center (TDC), the ignition timing is advanced. As the piston position in the compression stroke cylinder becomes closer to the top dead center (TDC), the amount of the air contained in the compression stroke cylinder is decreased, and therefore, the torque generated when the engine 1 is restarted is decreased. Accordingly, as the piston position in the compression stroke cylinder becomes closer to the top dead center, the ignition timing is advanced to increase the torque generated in the compression stroke cylinder when the engine 1 is restarted. The relation shown in FIG. 7 is obtained in advance through experiment or the like, and a map indicating the relation shown in FIG. 7 is stored in the ROM of the ECU 20. By executing this process, the ECU 20 may be regarded as the ignition timing correction means according to the invention.

Next, in step S34, the ECU 20 starts a starter (not shown). Subsequently, in step S35, the ECU 20 determines whether the crank angle of the crankshaft 9 of the engine 1 is equal to the calculated ignition timing for the compression stroke cylinder, that is, an ignition control start timing. When it is determined that the crank angle of the crankshaft 9 of the engine 1 is not equal to the ignition control start timing, the current control routine is finished. When it is determined that the crank angle of the crankshaft 9 of the engine 1 is equal to the ignition control start timing, the routine proceeds to step S36. In step S36, the ECU 20 executes an ignition control. In the ignition control, first, the fuel in the compression stroke cylinder is ignited at the calculated ignition timing. Then, the ignition control is executed in a known control manner applied to an ordinary engine. Then, the current control routine is finished.

By executing the control routine in FIG. 6, and correcting the ignition timing at the time of restart of the engine 1 based on the piston stop position in the compression stroke cylinder, the torque generated in the compression stroke cylinder at the time of restart of the engine 1 is controlled to appropriate torque required to restart the engine 1. Thus, the engine 1 is smoothly started.

Figure 8:
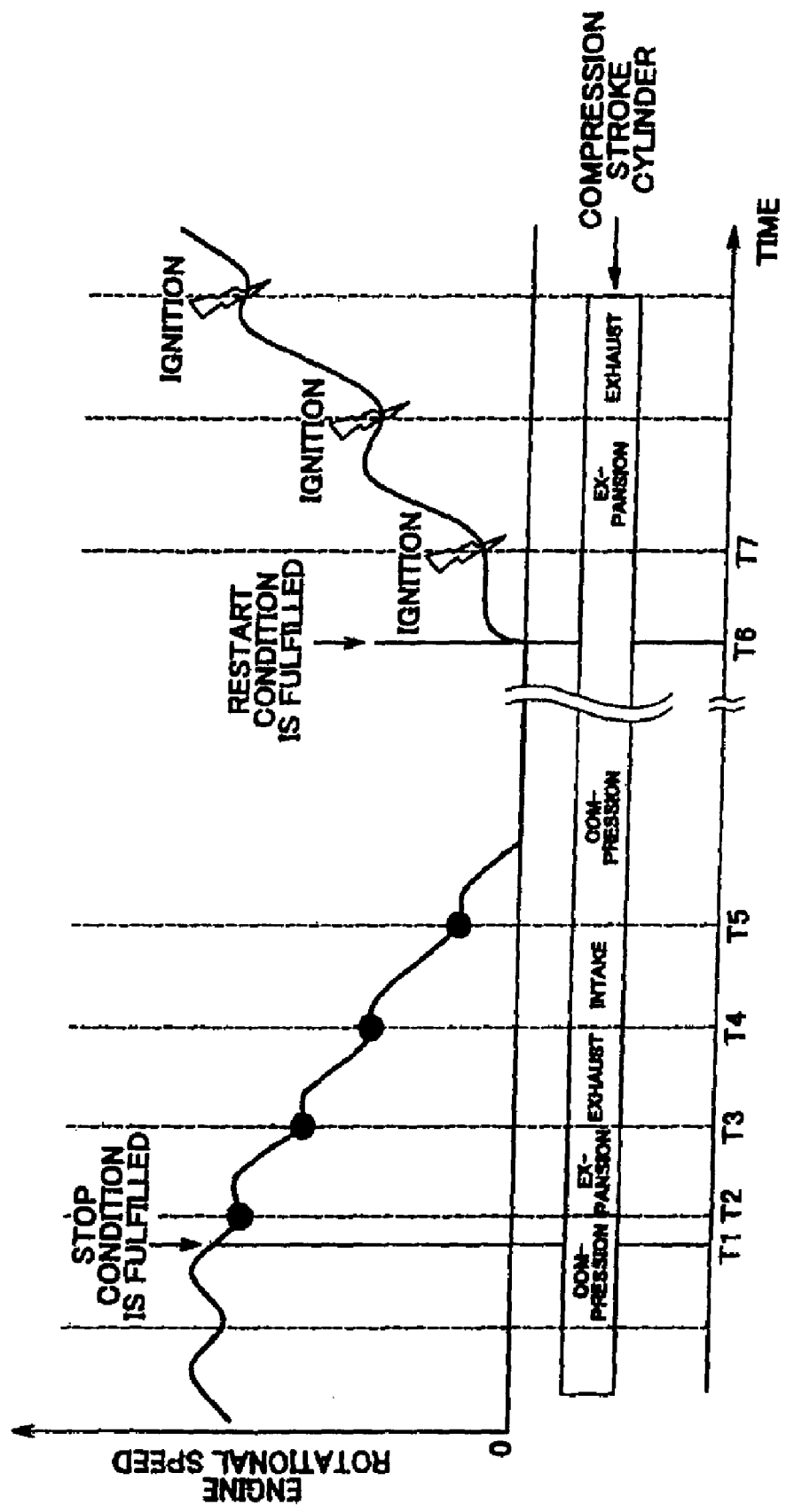
FIG. 8 is a diagram showing an example of a time-dependent change in a rotational speed of an engine, and an example of a time-dependent change in the state of the compression stroke cylinder, when a preliminary injection control is executed by executing the control routine in FIG. 2, and then, fuel contained in the compression stroke cylinder is ignited to restart the engine by executing the control routine in FIG. 6.

FIG. 8 is a diagram showing an example of a time-dependent change in the rotational speed of the engine 1, and an example of a time-dependent change in the state of the compression stroke cylinder, when the preliminary injection control is executed by executing the control routine in FIG. 2, and then, the fuel contained in the compression stroke cylinder is ignited to restart the engine 1 by executing the control routine in FIG. 6. As shown in FIG. 8, when the predetermined stop condition is fulfilled at time point T1 at which the cylinder 2 that serves as the compression stroke cylinder is in the compression stroke, fuel cut is performed at the time point. Then, until the engine 1 is stopped, the estimated stop angle is determined at time points T2, T3, T4, and T5 at which each of the four pistons 5 is near the top dead center. After the engine 1 is stopped, when the restart condition is fulfilled at time point T6, the starter (not shown) is started. At this time point, the ignition timing for the compression stroke cylinder is calculated. Then, the fuel contained in the compression stroke cylinder is ignited at time point T7, and thus, the engine 1 is restarted. As shown in FIG. 8, by executing the control routine in FIG. 2, the compression stroke cylinder contains the fuel in an appropriate amount corresponding to the amount of the air contained in the compression stroke cylinder when the engine 1 is stopped. Also, by executing the control routine in FIG. 6, the ignition timing for the compression stroke cylinder at the time of restart of the engine 1 is corrected to an appropriate ignition timing corresponding to the amount of the air contained in the compression stroke cylinder. Therefore, the torque generated in the compression stroke cylinder at the time of restart of the engine 1 is controlled to appropriate torque required to start the engine 1. By executing these controls, it is possible to gradually increase the rotational speed of the engine 1 at the time of restart of the engine 1, as shown in FIG. 8. Therefore, the engine 1 is smoothly started.

Figure 9:
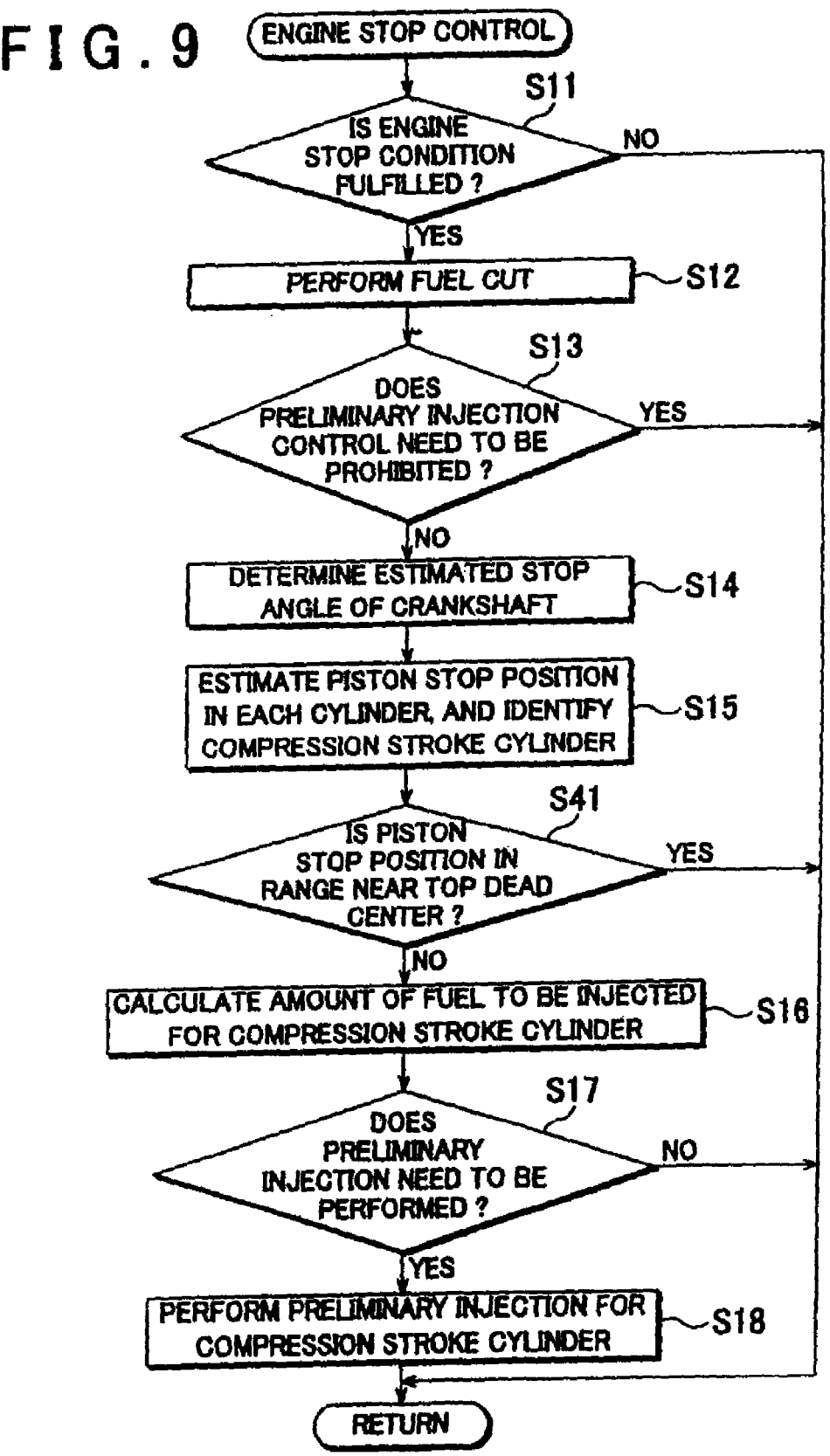
FIG. 9 is a flowchart showing a modified example of the engine stop control routine.
Figure 10:
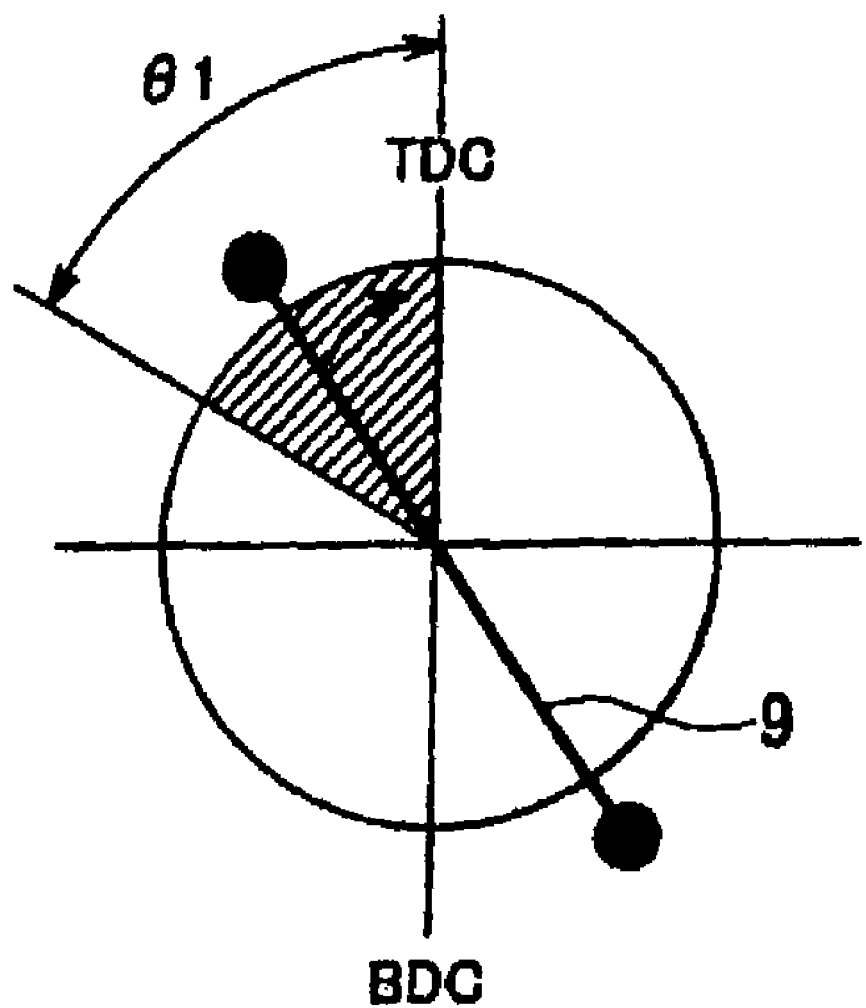
FIG. 10 is a diagram illustrating a predetermined range in which the preliminary injection control is prohibited.

FIG. 9 shows a modified example of the engine stop control routine executed by the ECU 20. The modified example in FIG. 9 is the same as the routine shown in FIG. 2, except that step S41 is provided between step S15 and step S16. Therefore, in FIG. 9, the same steps are denoted by the same reference numerals, and the description thereof will be omitted. In the modified example in FIG. 9, in steps S11 to S15, the same processes as those in steps S11 to S15 in FIG. 2 are executed. In step S41, the ECU 20 determines whether the estimated piston stop position in the compression stroke cylinder is in a predetermined range θ1 near the top dead center (TDC). As shown in FIG. 10, the predetermined range θ1 is equivalent to the crank angle range corresponding to the late stage of the compression stroke. When it is determined that the estimated piston stop position in the compression stroke cylinder is in the predetermined range θ1, the current control routine is finished. When it is determined that the estimated piston stop position in the compression stroke cylinder is out of the predetermined range θ1, the routine proceeds to step S16. Then, in steps S17 and S18, the same processes as those in steps S17 and S18 in FIG. 2 are executed. Then, the current control routine is finished.

When the piston 5 in the compression stroke cylinder is stopped in the crank angle range θ1 as shown in FIG. 10, the amount of the air contained in the compression stroke cylinder when the engine 1 is stopped is small. In this case, even if the fuel is supplied to the compression stroke cylinder, and the fuel is ignited at the time of restart of the engine 1, the torque required to start the engine 1 may not be generated in the compression stroke cylinder. Accordingly, when the estimated piston stop position in the compression stroke cylinder is in the predetermined range θ1, the control routine is finished, and the execution of the preliminary injection control is prohibited. This prevents unnecessary consumption of the fuel. By executing step S41 in FIG. 9, the ECU 20 may be regarded as the preliminary injection control prohibition means according to the invention. Also, the predetermined range θ1 may be regarded as the late stage crank angle range according to the invention.

Figure 11A:
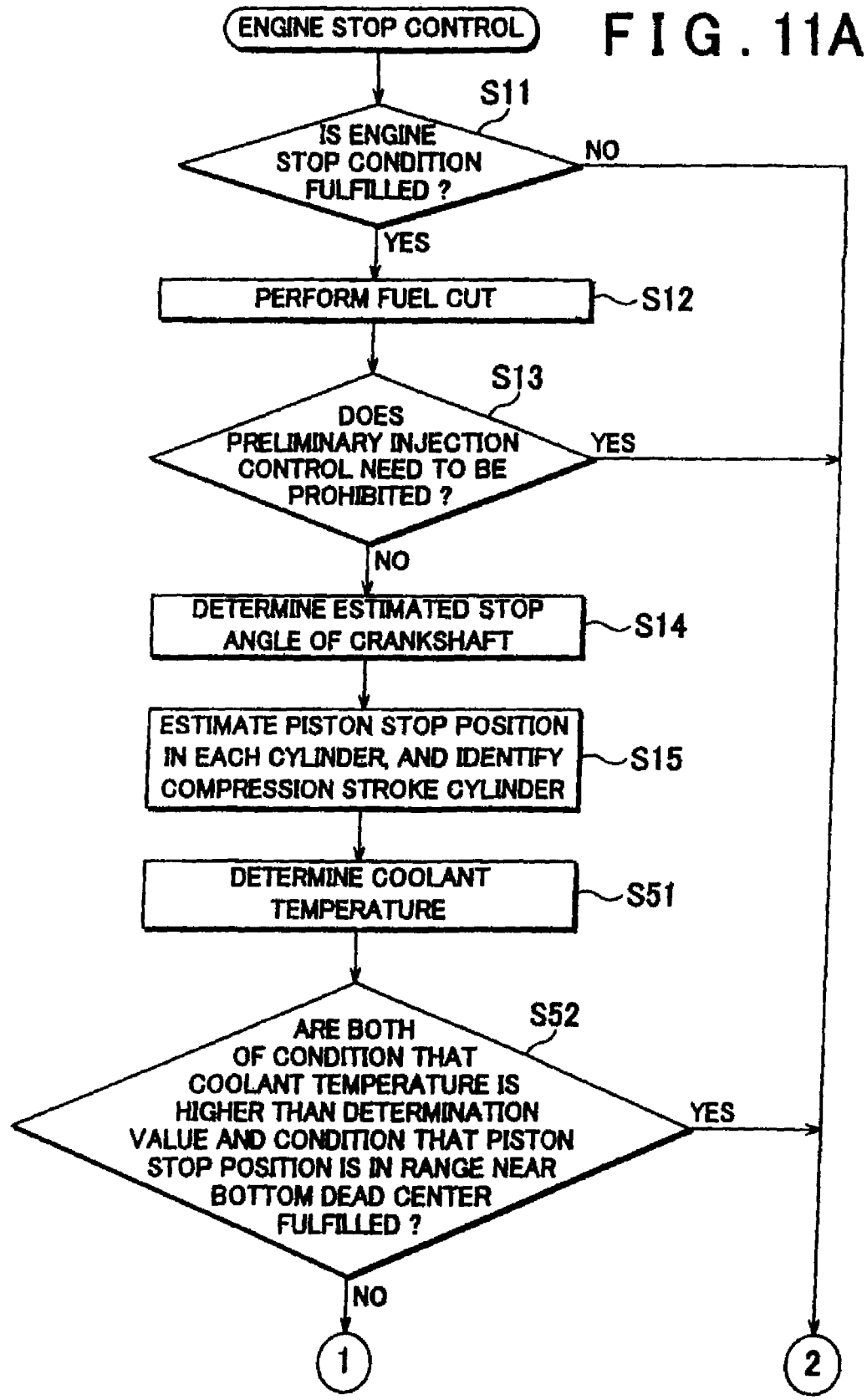
FIGS. 11A and 11B are flowcharts showing another modified example of the engine stop control routine.
Figure 11B:
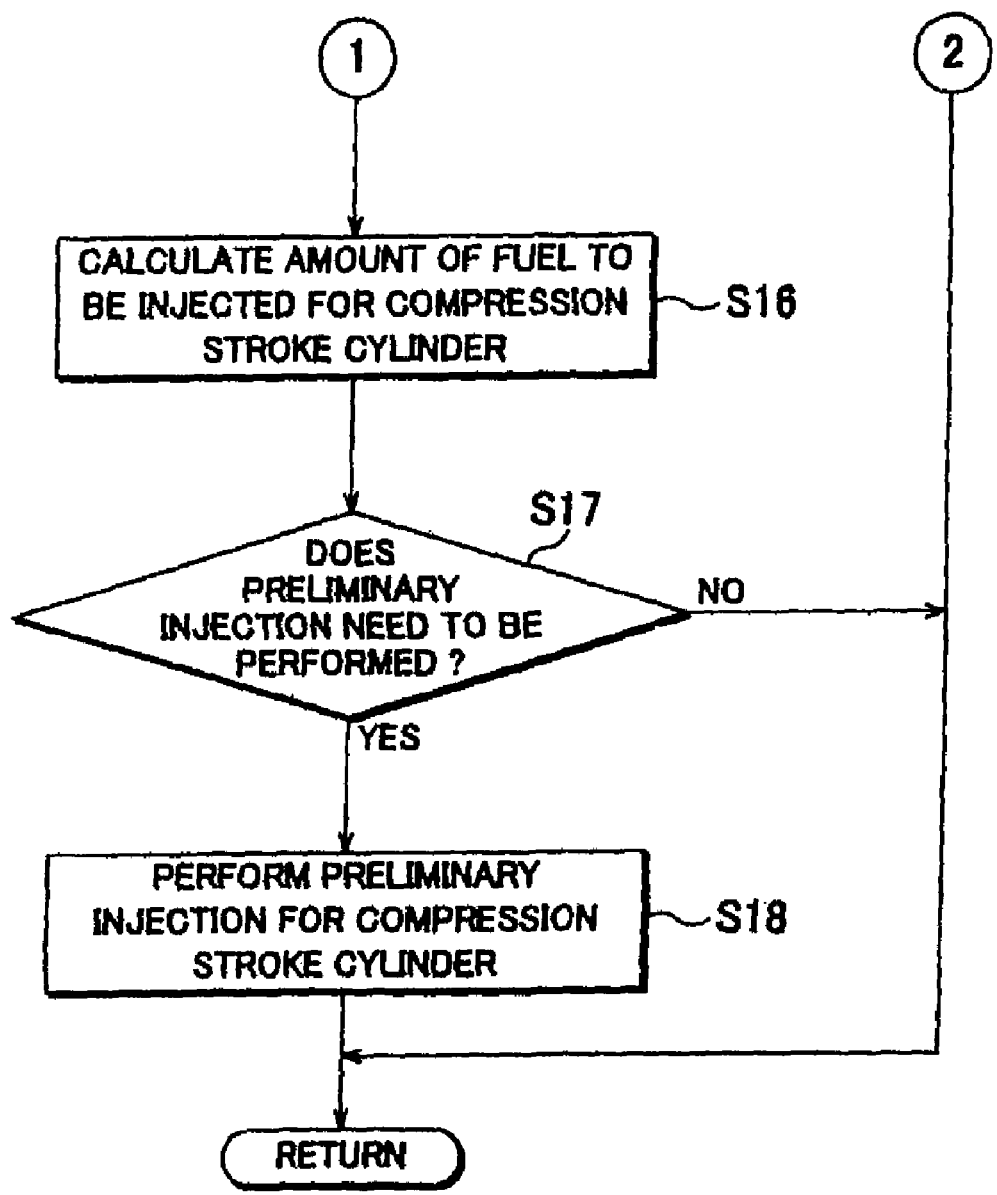
Figure 12:
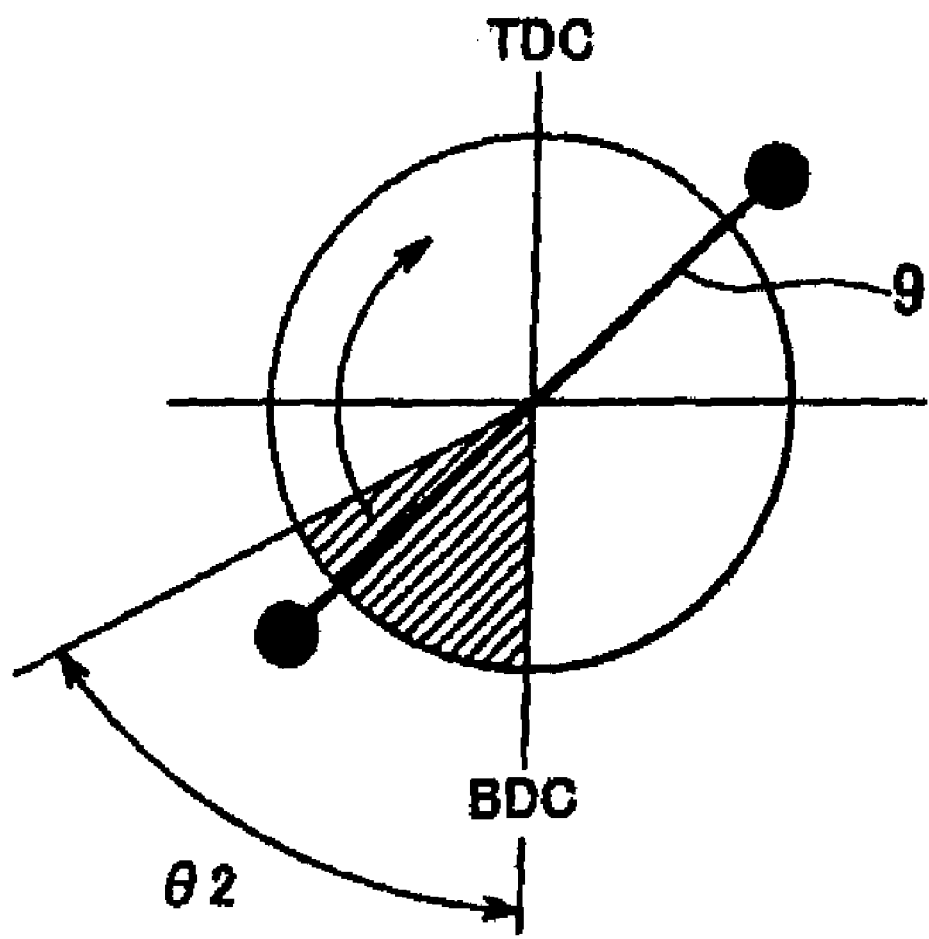
FIG. 12 is a diagram illustrating a predetermined range in which execution of the preliminary injection control is prohibited to prevent occurrence of self-ignition.

FIG. 11A, 11B show another modified example of the engine stop control routine executed by the ECU 20. The modified example in FIG. 11A, 11B is the same as the routine in FIG. 2, except that steps S51 and S52 are provided between step S15 and step S16 in FIG. 2. Therefore, in FIG. 11A, 11B, the same steps as those in FIG. 2 are denoted by the same reference numerals, and the description thereof will be omitted. In the modified example in FIG. 11A, 11B, in steps S11 to S15, the same processes as those in steps S11 to S15 in FIG. 2 are executed. In step S51, the ECU 20 determines the temperature of the coolant for the engine 1 based on the signal output from the coolant temperature sensor 23. Next, in step S52, the ECU 20 determines whether the determined coolant temperature is higher than a preset determination value, and the estimated piston stop position in the compression stroke cylinder is in a predetermined range θ2 near the bottom dead center (BDC). As shown in FIG. 12, the predetermined range θ2 is equivalent to the crank angle range corresponding to the early stage of the compression stroke. For example, the determination value is set to a coolant temperature at which the temperature of the air in the compression stroke cylinder is estimated to be increased to a temperature at which self-ignition is caused, due to heat of the engine 1 after the engine 1 is stopped. When it is determined that the coolant temperature is higher than the determination value, and the estimated piston stop position in the compression stroke cylinder is in the predetermined range θ2, the current control routine is finished. When it is determined that the coolant temperature is equal to or lower than the determination value, or the estimated piston stop position in the compression stroke cylinder is out of the predetermined range θ2, the routine proceeds to step S16. Then, in steps S17 and S18, the same processes as those in steps S17 and S18 in FIG. 2 are executed. Then, the current control routine is finished.

When the piston stop position in the compression stroke cylinder is in the predetermined range θ2 shown in FIG. 12, and the coolant temperature is higher than the determination value, the air in the compression stroke cylinder may be heated by the heat of the engine 1, and the self-ignition may be caused, when the engine 1 is stopped. Accordingly, when it is determined that the coolant temperature is higher than the determination value, and the estimated piston stop position in the compression stroke cylinder is in the predetermined range θ2, the control routine is finished, and the execution of the preliminary injection control is prohibited. This suppresses occurrence of the self-ignition while the engine 1 is stopped. By executing the process in step S52 in FIG. 11A, the ECU 20 may be regarded as the self-ignition prevention means according to the invention. The predetermined range θ2 may be regarded as the early stage crank angle range according to the invention.

Figure 13:
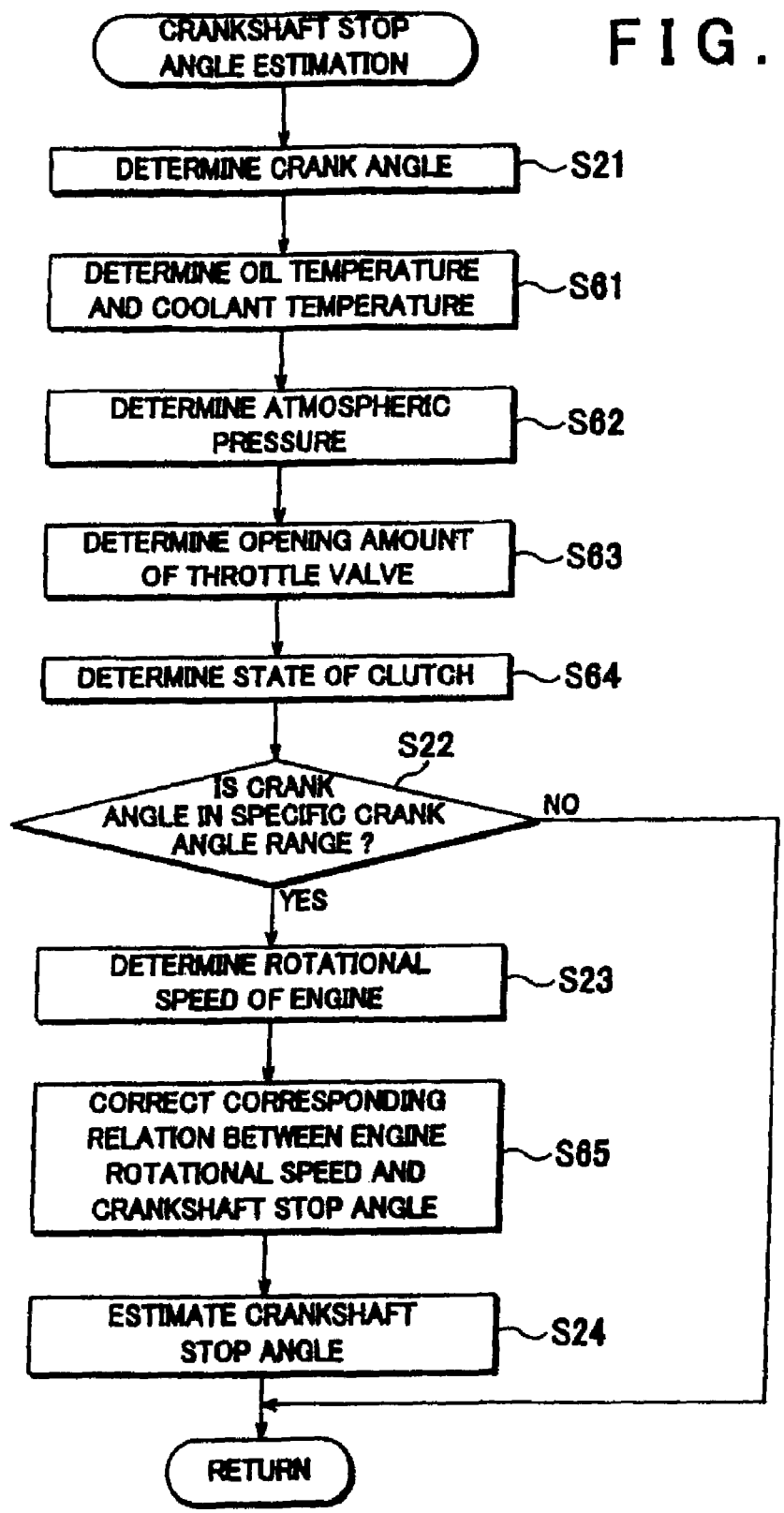
FIG. 13 is a flowchart showing a modified example of the crankshaft stop angle estimation routine.

FIG. 13 shows a modified example of the crankshaft stop angle estimation routine executed by the ECU 20. The modified example in FIG. 13 is the same as the routine in FIG. 3, except that steps S61 to S64 are provided between step S21 and step S22, and step S65 is provided between step S23 and step S24. Therefore, in FIG. 13, the same steps as those in FIG. 3 are denoted by the same reference numerals, and the description thereof will be omitted.

In the routine in FIG. 13, first, in step S21, the ECU 20 determines the crank angle. Subsequently, in step S61, the ECU 20 determines the temperature of oil (hereinafter, may be simply referred to as "oil temperature"), and the temperature of the coolant for the engine 1 (i.e., the coolant temperature). Next, in step S62, the ECU 20 determines the atmospheric pressure. Then, in step S63, the ECU 20 determines the opening amount of the throttle valve 14. Subsequently, in step S64, the ECU 20 determines the state of a clutch that connects/disconnects the engine 1 to/from a transmission (not shown). For example, the ECU 20 determines that the clutch is in an engaged state, or a disengaged state.

Next, in step S22, the ECU 20 determines whether the determined crank angle is in the specific crank angle range. When it is determined that the determined crank angle is out of the specific crank angle range, the current routine ends. When it is determined that the determined crank angle is in the specific crank angle range, the routine proceeds to step S23. In step S23, the ECU 20 determines the rotational speed of the engine 1, that is, the rotational speed of the crankshaft 9.

Figure 14:
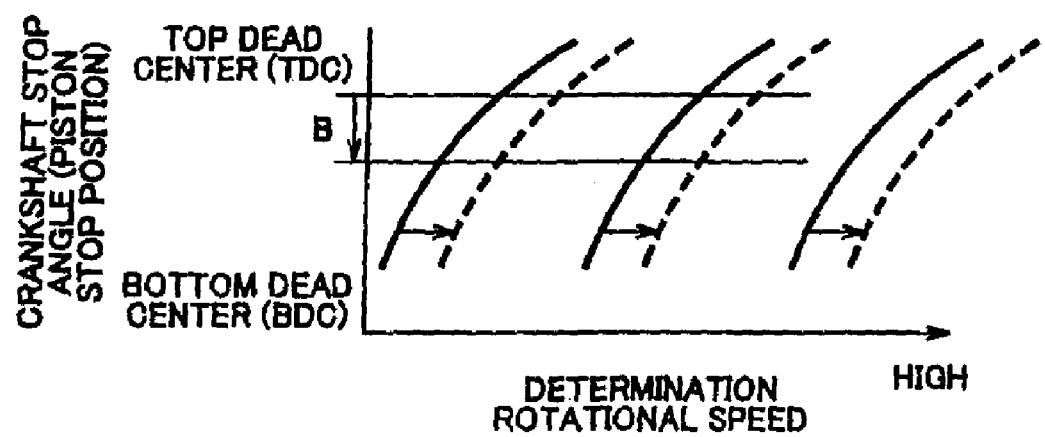
FIG. 14 is a diagram illustrating a method of correcting a corresponding relation between the crankshaft stop angle and the determination rotational speed.

Next, in step S65, the ECU 20 corrects a corresponding relation between the determination rotational speed and the crankshaft stop angle, based on the oil temperature, the coolant temperature, the atmospheric pressure, the opening amount of the throttle valve, and the state of the clutch, which are determined. A correction method will be described with reference to FIG. 14. FIG. 14 shows a graph indicating the relation between the determination rotational speed and the crankshaft stop angle, which is obtained by rotating the graph in FIG. 4 by 90 degrees in a clockwise direction in FIG. 4. As described above, the stop angle of the crankshaft 9 is influenced by the friction, the pumping loss, and the like of the engine 1. As is generally known, when the oil temperature and the coolant temperature are high, the viscosity of the oil is decreased, and therefore, the friction of the engine 1 is decreased. Accordingly, as compared to when the oil temperature and the coolant temperature are low, the crankshaft 9 is easily rotated, and the corresponding relation between the determination rotational speed and the crankshaft stop angle is changed. When the atmospheric pressure is low or when the opening amount of the throttle valve is small, the intake air is taken into the cylinders 2 less easily, and therefore, the pumping loss is increased, as compared to when the atmospheric pressure is high or when the opening amount of the throttle valve is large. In this case, the crankshaft 9 is rotated less easily, and the corresponding relation between the determination rotational speed and the crankshaft stop angle is changed. The inertia of the crankshaft 9 during fuel cut is changed according to whether the clutch is in the engaged state or the disengaged state. For example, when the clutch is in the disengaged state, no load is applied to the transmission, and therefore, the inertia energy is decreased. As a result, the corresponding relation between the determination rotational speed and the crankshaft stop angle is changed. Thus, the oil temperature, the coolant temperature, the atmospheric pressure, the opening amount of the throttle valve, and the state of the clutch are correlated with parameters that influence the corresponding relation between the determination rotational speed and the crankshaft stop angle. Therefore, the corresponding relation is corrected based on the oil temperature, the coolant temperature, the atmospheric pressure, the opening amount of the throttle valve, and the state of the clutch. For example, when the oil temperature and the coolant temperature are low, and therefore, the crankshaft 9 is rotated less easily, the crank angle, at which the crankshaft 9 is stopped, is advanced, even if the rotational speed of the engine 1 determined in the specific crank angle range is unchanged. That is, even if the rotational speed of the engine 1 is unchanged, the stop position of the crankshaft 9 moves toward the bottom dead center (BDC) as shown by the arrow B in FIG. 14. Accordingly, as shown in FIG. 14, the lines indicating the corresponding relation are shifted rightward in FIG. 14, and thus, the lines indicating the corresponding relation are corrected to the positions shown by the dotted lines in FIG. 14. By executing this process, the ECU 20 may be regarded as the correction means according to the invention.

Subsequently, in step S24, the ECU 20 estimates the crankshaft stop angle based on the corrected corresponding relation and the determined rotational speed of the engine 1. Then, the current routine is finished.

By correcting the corresponding relation between the determination rotational speed and the crankshaft stop angle based on the oil temperature, the coolant temperature, the atmospheric pressure, the opening amount of the throttle valve, and the state of the clutch, it is possible to increase the accuracy of estimating the crankshaft stop angle. The corresponding relation need not necessarily be corrected using all of the oil temperature, the coolant temperature, the atmospheric pressure, the opening amount of the throttle valve, and the state of the clutch. By correcting the corresponding relation using at least one of the oil temperature, the coolant temperature, the atmospheric pressure, the opening amount of the throttle valve, and the state of the clutch, it is possible to increase the accuracy of estimating the crankshaft stop angle.

Figure 15:
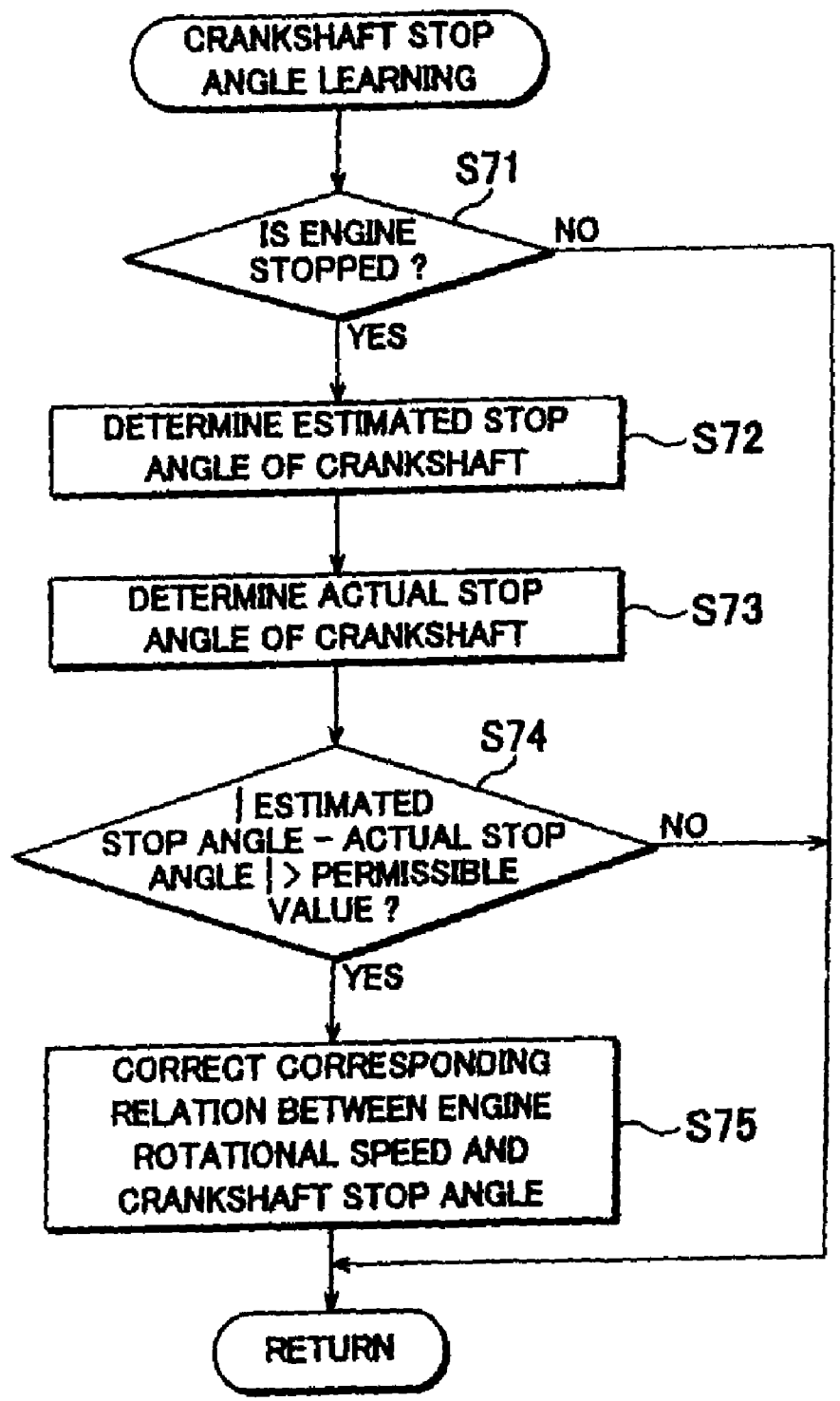
FIG. 15 is a flowchart showing a crankshaft stop angle learning routine executed by an ECU in FIG. 1.

For example, the friction of the engine 1 is changed according to an operating time of the engine 1. Therefore, the corresponding relation between the determination rotational speed and the crankshaft stop angle is changed according to the operating time of the engine 1. Accordingly, the ECU 20 may determine a difference between the estimated crankshaft stop angle and a crank angle at which the crankshaft 9 is actually stopped, and may correct the corresponding relation between the determination rotational speed and the crankshaft stop angle, based on the difference. FIG. 15 shows a crankshaft stop angle learning routine executed by the ECU 20 to correct the corresponding relation between the determination rotational speed and the crankshaft stop angle, at predetermined time intervals, regardless of whether the engine 1 is being operated. By executing the routine, the ECU 20 may be regarded as the learning means according to the invention.

In the routine in FIG. 15, first, in step S71, the ECU 20 determines whether the engine 1 is stopped. When the ECU 20 determines that the engine 1 is being operated, the current routine is finished. When the ECU 20 determines that the engine 1 is stopped, the routine proceeds to step S72. In step S72, the ECU 20 obtains the estimated stop angle of the crankshaft 9. The ECU 20 obtains the value calculated in the crankshaft stop angle estimation routine, as the estimated stop angle. Subsequently, in step S73, the ECU 20 determines the stop angle (actual stop angle) at which the crankshaft 9 is actually stopped, referring to the signal output from the crank angle sensor 21.

Figure 16:
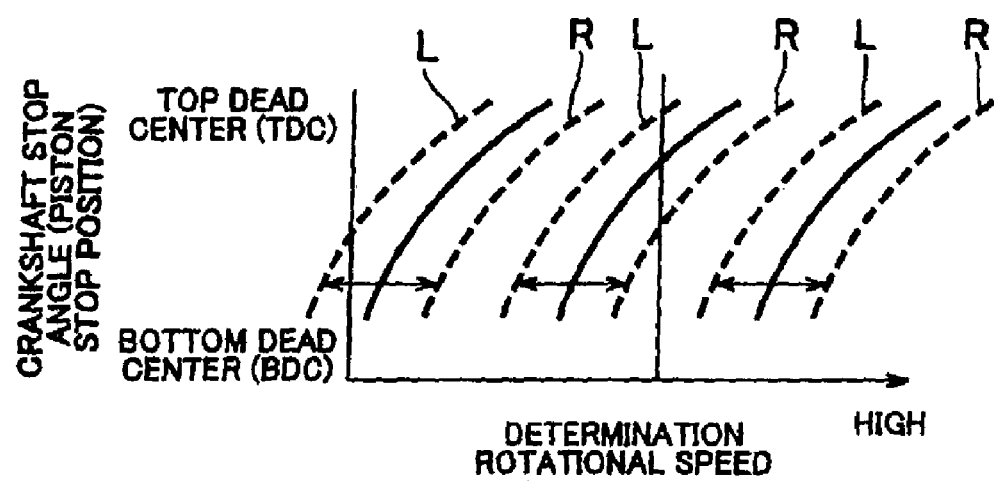
FIG. 16 is a diagram illustrating a method of correcting the corresponding relation between the crankshaft stop angle and the determination rotational speed.

Next, in step S74, the ECU 20 determines whether an absolute value of a value obtained by subtracting the actual stop angle from the estimated stop angle is larger than a permissible value. For example, the permissible value is set so that if the difference between the estimated stop angle and the actual stop angle is equal to the permissible value, the operating state of the engine 1 is hardly changed according to whether the estimated stop angle is used to calculate the amount of the fuel to be injected during the preliminary injection control, and the ignition timing to which the ignition timing is corrected at the time of restart of the engine 1, or the actual stop angle is used to calculate the amount of the fuel and the ignition timing. When it is determined that the absolute value of the value obtained by subtracting the actual stop angle from the estimated stop angle is equal to or lower than the permissible value, the current routine is finished. When it is determined that the absolute value of the value obtained by subtracting the actual stop angle from the estimated stop angle is larger than the permissible value, the routine proceeds to step S75. In step S75, the ECU 20 corrects the corresponding relation between the determination rotational speed and the crankshaft stop angle. A method of correcting the corresponding relation will be described with reference to FIG. 16. In the correction method, first, the estimated stop angle is compared with the actual stop angle. When the actual stop angle is larger than the estimated stop angle, it is determined that the crankshaft 9 is easily rotated. When the actual stop angle is smaller than the estimated stop angle, it is determined that the crankshaft 9 is rotated less easily. As described above, it is considered that when the crankshaft 9 is rotated less easily, the stop position of the crankshaft 9 is advanced. Therefore, for example, the lines indicating the corresponding relation are shifted rightward to the dashed lines R in FIG. 16. When portions of the engine 1 smoothly function, and the crankshaft 9 is easily rotated, the stop position of the crankshaft 9 is retarded. Therefore, for example, the lines indicating the corresponding relation are shifted leftward to the dashed line L in FIG. 16. A width by which the lines indicating the corresponding relation are shifted is set according to the difference between the estimated stop angle and the actual stop angle. A map indicating the corrected corresponding relation is stored in the RAM of the ECU 20. Then, the current routine is finished.

Because the corresponding relation between the determination rotational speed and the crankshaft stop angle is corrected in the above-described matter, the corresponding relation is corrected to a corresponding relation appropriate for the engine 1. Therefore, it is possible to further increase the accuracy of estimating the crankshaft stop angle.

The invention is not limited to the above-described embodiments, and the invention may be realized in various embodiments. For example, the engine to which the invention is applied is not limited to the four-cylinder engine. For example, the invention may be applied to engines with three, six, eight, ten, and twelve cylinders. The arrangement of the cylinders is not limited to a specific arrangement. For example, the invention may be applied to an in-line internal combustion engine, or a V-engine. The invention need not necessarily be applied to the case where the engine is stopped and started by the idling stop control. The invention may be applied to the case where the engine is stopped by turning an ignition switch off. Accordingly, the invention need not necessarily be applied to the engine for which the idling stop control is executed. The invention may be applied to an engine for which the idling stop control is not executed.

In the above-described embodiments, the crankshaft stop angle is estimated based on the rotational speed of the engine determined in the crank angle range corresponding to the late stage of the stroke in which the piston in each cylinder moves from the bottom dead center to the top dead center. However, the crankshaft stop angle may be estimated based on the rotational speed of the engine determined in a predetermined crank angle range other than the above-described range.

While the various elements of the example embodiments are shown in various combinations and configurations, other combinations and configurations, including more, less or only a single element, are also within the spirit and scope of the invention.

The invention claimed is:

1. A stop-start control method for an internal combustion engine that includes a plurality of cylinders, and fuel injection valves provided in intake ports for the respective cylinders, the stop-start control method comprising:
    determining whether a predetermined stop condition is fulfilled;
    stopping injection from each of the fuel injection valves, when the predetermined stop condition is fulfilled;
    determining an estimated position of a piston in each of the cylinders, which is a position at which the piston in each of the cylinders is estimated to be located when the internal combustion engine is stopped, during a stop process period from when the predetermined stop condition is fulfilled until when the internal combustion engine is stopped;
    identifying a compression stroke cylinder in which the piston is to be stopped in a compression stroke, based on the estimated position of the piston in each of the cylinders;
    setting a fuel amount that is an amount of the fuel to be injected from the fuel injection valve provided in the intake port for the compression stroke cylinder during the stop process period, based on the estimated position of the piston in the compression stroke cylinder; and
    executing a preliminary injection control that causes the fuel injection valve provided in the intake port for the compression stroke cylinder to inject the fuel in the set fuel amount in a last intake stroke or before the last intake stroke during the stop process period so that the fuel is contained in the compression stroke cylinder when the internal combustion engine is stopped.

2. A stop-start control method for a spark ignition internal combustion engine that includes a plurality of cylinders, and ignition plugs provided for the respective cylinders, the stop-start control method comprising:
    stopping the internal combustion engine when a predetermined stop condition is fulfilled, in a manner such that fuel is contained in a compression stroke cylinder in which a piston is stopped in a compression stroke when the internal combustion engine is stopped;
    determining a position of the piston in the compression stroke cylinder when the internal combustion engine is stopped;
    correcting an ignition timing for the compression stroke cylinder at a time of start of the internal combustion engine, based on the determined position of the piston, when a predetermined start condition is fulfilled; and
    starting the internal combustion engine by igniting the fuel contained in the compression stroke cylinder, based on the corrected ignition timing.

3. A stop-start control apparatus for a spark ignition internal combustion engine that includes a plurality of cylinders, and ignition plugs provided for the respective cylinders,
    the stop-start control apparatus comprising:
    a control portion that when a predetermined stop condition is fulfilled, stops the internal combustion engine in a manner such that fuel is contained in a compression stroke cylinder in which a piston is stopped in a compression stroke when the internal combustion engine is stopped, and that when a predetermined start condition is fulfilled, starts the internal combustion engine by igniting the fuel contained in the compression stroke cylinder;
    a piston position determination portion that determines a position of the piston in the compression stroke cylinder when the internal combustion engine is stopped; and
    an ignition timing correction portion that corrects an ignition timing for the compression stroke cylinder at a time of start of the internal combustion engine, based on the position of the piston determined by the piston position determination portion, when the predetermined start condition is fulfilled.

4. The stop-start control apparatus according to claim 3, wherein the ignition timing correction portion advances the ignition timing for the compression stroke cylinder, as the position of the piston determined by the piston position determination portion becomes closer to a top dead center.

5. The stop-start control apparatus according to claim 3, wherein the predetermined stop condition is a condition for stopping the internal combustion engine in an idling stop control.

6. A stop-start control apparatus for an internal combustion engine that includes a plurality of cylinders, and fuel injection valves provided in intake ports for the respective cylinders, the stop-start control apparatus comprising:
a control portion that stops the internal combustion engine by stopping injection of fuel from each of the fuel injection valves, when a predetermined stop condition is fulfilled,
a cylinder identification portion that determines an estimated position of a piston in each of the cylinders, which is a position at which the piston in each of the cylinders is estimated to be located when the internal combustion engine is stopped, during a stop process period from when the predetermined stop condition is fulfilled until when the internal combustion engine is stopped, and identifying a compression stroke cylinder in which the piston is to be stopped in a compression stroke, based on the estimated position of the piston in each of the cylinders;
a fuel amount setting portion that sets a fuel amount that is an amount of the fuel to be injected from the fuel injection valve provided in the intake port for the compression stroke cylinder during the stop process period, based on the estimated position of the piston in the compression stroke cylinder, which is determined by the cylinder identification portion; and
a preliminary injection control portion that executes a preliminary injection control that causes the fuel injection valve provided in the intake port for the compression stroke cylinder to inject the fuel in the fuel amount set by the fuel amount setting portion in a last intake stroke or before the last intake stroke during the stop process period so that the fuel is contained in the compression stroke cylinder when the internal combustion engine is stopped.

7. The stop-start control apparatus according to claim 6, wherein the fuel amount setting portion sets the fuel amount so that the fuel amount decreases as the estimated position of the piston in the compression stroke cylinder, which is determined by the cylinder identification portion, becomes closer to a top dead center.

8. The stop-start control apparatus according to claim 6, further comprising
a preliminary injection control prohibition portion that prohibits execution of the preliminary injection control, if the cylinder identification portion estimates that the piston in the compression stroke cylinder is to be stopped in a predetermined late stage crank angle range corresponding to a late stage of the compression stroke when the internal combustion engine is stopped.

9. The stop-start control apparatus according to claim 6, further comprising:
a coolant temperature determination portion that determines a temperature of a coolant for the internal combustion engine; and
a self ignition prevention portion that prohibits execution of the preliminary injection control, if the temperature of the coolant determined by the coolant temperature determination portion is higher than a determination temperature, and the cylinder identification portion estimates that the piston in the compression stroke cylinder is to be stopped in a predetermined early stage crank angle range corresponding to an early stage of the compression stroke when the internal combustion engine is stopped.

10. The stop-start control apparatus according to claim 6, wherein the predetermined stop condition is a condition for stopping the internal combustion engine in an idling stop control.

11. The stop-start control apparatus according to claim 6, wherein:
the internal combustion engine is a spark ignition internal combustion engine in which ignition plugs are provided for the respective cylinders; and
the stop-start control apparatus further includes a start control portion that starts the internal combustion engine when a predetermined start condition is fulfilled, and ignition timing correction portion that corrects an ignition timing for the compression stroke cylinder at a time of start of the internal combustion engine, based on the position of the piston in the compression stroke cylinder.

12. The stop-start control apparatus according to claim 11, wherein the ignition timing correction portion advances the ignition timing for the compression stroke cylinder, as the position of the piston in the compression stroke cylinder becomes closer to a top dead center.

13. The stop-start control apparatus according to claim 6, further comprising:
a rotational speed determination portion that determines a rotational speed of a crankshaft of the internal combustion engine; and
a storage portion that stores a map indicating a corresponding relation between a rotational speed of the internal combustion engine in a predetermined crank angle range during the stop process period, and the position of the piston in each of the cylinders when the internal combustion engine is stopped, wherein
the cylinder identification portion determines the estimated position of the piston in each of the cylinders when the internal combustion engine is stopped, based on the map, and the rotational speed in the predetermined crank angle range during the stop process period, which is determined by the rotational speed determination portion.

14. The stop-start control apparatus according to claim 13, wherein the predetermined crank angle range is a crank angle range corresponding to a late stage of a stroke in which the piston in each of the cylinders moves from a bottom dead center to a top dead center.

15. The stop-start control apparatus according to claim 13, wherein the cylinder identification portion includes a correction portion that corrects the corresponding relation in the map, based on at least one of a temperature of a coolant for the internal combustion engine, a temperature of oil for the internal combustion engine, an opening amount of a throttle valve of the internal combustion engine, a state of a clutch portion that connects/disconnects the internal combustion engine to/from a transmission, and an atmospheric pressure.

16. The stop-start control apparatus according to claim 13, further comprising
a piston position determination portion that determines the position of the piston in each of the cylinders when the internal combustion engine is stopped; and
a learning portion that corrects the corresponding relation in the map stored in the storage portion, based on a difference between the position of the piston in each of the cylinders determined by the piston position determination portion after the internal combustion engine is stopped due to fulfillment of the predetermined stop condition, and the estimated position of the piston in each of the cylinders determined by the cylinder identification portion.

* * * * *